(12) United States Patent
Yang et al.

(10) Patent No.: US 11,404,894 B2
(45) Date of Patent: Aug. 2, 2022

(54) PRE-CHARGING CIRCUIT AND PRE-CHARGING METHOD FOR HIGH VOLTAGE BATTERY PACK

(71) Applicant: CONTEMPORARY AMPEREX TECHNOLOGY CO., LIMITED, Ningde (CN)

(72) Inventors: Dachun Yang, Ningde (CN); Baohai Du, Ningde (CN); Yanhui Fu, Ningde (CN); Qiandeng Li, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 365 days.

(21) Appl. No.: 16/587,126

(22) Filed: Sep. 30, 2019

(65) Prior Publication Data

US 2020/0235586 A1 Jul. 23, 2020

(30) Foreign Application Priority Data

Jan. 23, 2019 (CN) .......................... 201910064176.6

(51) Int. Cl.
*H02J 7/00* (2006.01)
*G06F 13/40* (2006.01)
(Continued)

(52) U.S. Cl.
CPC .......... *H02J 7/007* (2013.01); *G06F 13/4077* (2013.01); *H02H 9/001* (2013.01); *H02J 7/0068* (2013.01); *H02M 3/33507* (2013.01)

(58) Field of Classification Search
CPC .. H02J 7/007; H02J 7/00; H02J 7/068; H02H 9/001; H02H 9/00; H02M 3/335; H02M 3/33507; G06F 13/4077; G06F 13/40
(Continued)

(56) References Cited

U.S. PATENT DOCUMENTS

2007/0108939 A1 5/2007 Miyagi et al.
2011/0111268 A1* 5/2011 Weng .................. H01M 10/441
429/50
(Continued)

FOREIGN PATENT DOCUMENTS

CN 104901355 A 9/2015
CN 106143346 A 11/2016
(Continued)

OTHER PUBLICATIONS

International Search Report (and English translation) and Written Opinion of the International Searching Authority for International Application No. PCT/CN2020/072855 dated Apr. 22, 2020.
(Continued)

*Primary Examiner* — Richard Isla
*Assistant Examiner* — Dung V Bui
(74) *Attorney, Agent, or Firm* — Heslin Rothenberg Farley & Mesiti, PC

(57) ABSTRACT

Embodiments of the present disclosure relate to the field of battery technologies, and disclose a pre-charging circuit for a high voltage battery pack and a pre-charging method therefor. In some embodiments of the present disclosure, during a charging process, a control module switches on a charging switching module and switches off a charging pre-charging module after determining that a voltage at the first end of the charging switching module and a voltage at the second end of the charging switching module comply with a first constraint relationship; during a discharging process, the control module switches on the main positive switching module and switches off the main positive pre-charging module after determining that a voltage at the first end of the main positive switching module and a voltage at the second end of the main positive switching module comply with a second constraint relationship.

19 Claims, 12 Drawing Sheets

(51) Int. Cl.
*H02M 3/335* (2006.01)
*H02H 9/00* (2006.01)

(58) Field of Classification Search
USPC .......................................................... 320/127
See application file for complete search history.

(56) References Cited

U.S. PATENT DOCUMENTS

| | | | | |
|---|---|---|---|---|
| 2011/0260531 | A1* | 10/2011 | Obayashi | B60L 50/16 307/10.1 |
| 2013/0113430 | A1* | 5/2013 | Kim | H02J 7/0032 320/134 |
| 2013/0175857 | A1* | 7/2013 | Shreevani | B60L 3/0046 307/9.1 |
| 2013/0265005 | A1* | 10/2013 | Kurita | B60L 53/22 320/109 |
| 2014/0021916 | A1* | 1/2014 | Bilezikjian | H02J 7/0027 320/109 |
| 2015/0061376 | A1* | 3/2015 | Hartl | B60L 3/0046 307/9.1 |
| 2015/0091377 | A1* | 4/2015 | Namou | B60L 3/04 307/10.1 |
| 2016/0001766 | A1* | 1/2016 | Mori | B60L 15/2045 701/22 |
| 2016/0089998 | A1* | 3/2016 | Thommes | B60L 53/53 701/22 |
| 2017/0098943 | A1* | 4/2017 | Kubota | H02J 7/0068 |
| 2017/0129350 | A1* | 5/2017 | Mitsutani | H02M 3/158 |
| 2017/0197565 | A1* | 7/2017 | Yoneyama | B60R 16/0231 |
| 2018/0105043 | A1* | 4/2018 | Migita | H02M 7/537 |

FOREIGN PATENT DOCUMENTS

| | | |
|---|---|---|
| CN | 206211584 U | 5/2017 |
| CN | 107452995 A | 12/2017 |
| CN | 107482260 A | 12/2017 |
| CN | 107482741 A | 12/2017 |
| CN | 107528368 A | 12/2017 |
| CN | 107571739 A | 1/2018 |
| CN | 107585058 A | 1/2018 |
| CN | 207117205 U | 3/2018 |
| CN | 207117237 U | 3/2018 |
| CN | 108248390 A | 7/2018 |
| CN | 207925612 U | 9/2018 |
| CN | 108808819 A | 11/2018 |
| CN | 109818393 A | 5/2019 |
| JP | 2017184333 A | 10/2017 |
| WO | 2015019144 A2 | 2/2015 |

OTHER PUBLICATIONS

Chinese Search Report for Chinese Application No. 201910064176.6 dated Nov. 13, 2019.
Extended European Search Report for European Patent Application No. 19200314.3 dated Apr. 24, 2020.

* cited by examiner

PRE-CHARGING CIRCUIT AND PRE-CHARGING METHOD FOR HIGH VOLTAGE BATTERY PACK

CROSS-REFERENCE TO RELATED APPLICATION

This application claims the priority benefit of Chinese Patent Application No. 201910064176.6 filed on Jan. 23, 2019 and entitled "PRE-CHARGING CIRCUIT AND PRE-CHARGING METHOD FOR HIGH VOLTAGE BATTERY PACK", the disclosure of which is incorporated by reference herein in its entirety.

TECHNICAL FIELD

Embodiments of the present disclosure relate to the field of battery technologies, and in particular, to a pre-charging circuit and a pre-charging method for a high voltage battery pack.

BACKGROUND

Recently, due to global warming, environmental pollution and energy shortages, countries around the world have proposed a schedule for forbidding sale of fuel vehicles. With the incline of various preferential policies to new energy vehicles, more and more companies have seized this opportunity to vigorously develop the industry of new energy vehicles. Benefit from this, the industry of new energy vehicles develops very rapidly. However, there are also a lot of challenges in this new field, such as the basis for core technology is not strong, the entering for the industry of new energy vehicles is low, standards related thereto is not uniform, and infrastructure settings are not adequate.

However, the inventor has found that there are at least the following problems in the prior art: compared with conventional fuel vehicles, the biggest disadvantage of new energy vehicles is that the charging speed is high, and the charging time of new energy vehicles is much longer than the refueling time of fuel vehicles, thereby greatly wasting the customer' time. Based on this pain point in usage, many companies have developed a fast charging function, which greatly shortens the time for charging new energy vehicles. However, the existing fast charging branch and the discharging branch does not provide protection for high voltage switch, thus the high voltage switch may not be controlled sometimes, which greatly threatens the safety of battery pack and vehicles.

It should be noted that the information disclosed in this section is only for enhancing the understanding of the background of the present disclosure, and thus it may contain information that does not constitute prior art as known by those skilled in the art.

SUMMARY

An embodiment of the present disclosure provides a pre-charging circuit for a high voltage battery pack, comprising: a high voltage battery pack, a main positive switching module, a main positive pre-charging module, a charging switching module, a charging pre-charging module, a main negative switching module, and a control module; wherein, a positive electrode of the high voltage battery pack is connected to a first end of the main positive switching module and a first end of the charging switching module respectively, and a negative electrode of the high voltage battery pack is connected to a first end of the main negative switching module; a second end of the main positive switching module is connected to a main positive connection end of the pre-charging circuit, and a second end of the charging switching module is connected to a charging connection end of the pre-charging circuit, a second end of the main negative switching module is connected to a main negative connection end of the pre-charging circuit, the main positive pre-charging module is connected in parallel with the main positive switching module, and the charging pre-charging module is connected in parallel with the charging switching module; during a charging process, the control module controls the charging pre-charging module to be switched on, detecting a voltage at the first end of the charging switching module and a voltage at the second end of the charging switching module, and after determining that the voltage at the first end of the charging switching module and the voltage at the second end of the charging switching module conform with a first constraint relationship, switching on the charging switching module and switching off the charging pre-charging module; during a discharging process, the control module controls the main positive pre-charging module to be switched on, detecting a voltage at the first end of the main positive switching module and a voltage at the second end of the main positive switching module, and after determining that the voltage at the first end of the main positive switching module and the voltage at the second end of the main positive switching module conform with a second constraint relationship, switching on the main positive switching module and switching off the main positive pre-charging module.

An embodiment of the present disclosure further provides a pre-charging method for the high voltage battery pack applied to the pre-charging circuit for the high voltage battery pack mentioned in the above embodiment, the pre-charging method comprises the following steps: during the charging process, controlling the charging pre-charging module to be switched on; detecting a voltage at the first end of the charging switching module and a voltage at the second end of the charging switching module; determining if the voltage at the first end of the charging switching module and the voltage at the second end at the charging switching module conform with a first constraint relationship; if so, switching on the charging switching module, and switching off the charging pre-charging module; during the discharging process: controlling the main positive pre-charging module to be switched on; detecting a voltage at the first end of the main positive switching module and a voltage at the second end of the main positive switching module; determining if the voltage at the first end of the main positive switching module and the voltage at the second end of the main positive switching module conform with the second constraint relationship; and if so, switching on the main positive switching module, and switching off the main positive pre-charging module.

Compared with the prior art, the present embodiment provides a pre-charging circuit for the high voltage battery pack. During the charging, the high voltage battery pack pre-charges the capacitive component of the charging module through the charging pre-charging module, and the charging switching module is switched on after determining that the voltage at the first end of the charging switching module and the voltage at the second end of the charging switching module conform with the first constraint relationship, thereby reducing the difference between the voltage at the first end of the charging switching module and the voltage at the second end of the charging switching module.

As the difference between the voltage at the first end of the charging switching module and the voltage at the second end of the charging switching module is reduced, an excessive inrush current would not be generated at the moment when the charging switching module is switched on, and the life of the charging switching module would not be affected, thereby avoiding the problem that the charging switching module is conglutinated due to frequent generation of large inrush current, such that the control module cannot control the charging switching module to be switched off, and thus improving the safety of high voltage battery pack and electric vehicles. During the discharging, the high voltage battery pack pre-charges the capacitive component of the charging module through the main positive pre-charging module, and the main positive switching module is switched on after determining that the voltage at the first end of the main positive switching module and the voltage at the second end of the main positive switching module comply with the second constraint relationship, thereby reducing the difference between the voltage at the first end of the main positive switching module and the voltage at the second end of the main positive switching module. As the difference between the voltage at the first end of the main positive switching module and the voltage at the second end of the main positive switching module is reduced, an excessive inrush current would not be generated at the moment when the main positive switching module is switched on, and the life of the main positive switching module would not be affected, thereby avoiding the problem that the main positive switching module is conglutinated due to frequent generation of large inrush current, such that the control module cannot control the main positive switching module to be switched off, and thus improving the safety of high voltage battery pack and electric vehicles.

In addition, the pre-charging circuit for the high voltage battery pack further comprises a main negative pre-charging module connected in parallel with the main negative switching module. In this implementation, the main negative pre-charging module may be used as a backup pre-charging module for the main positive pre-charging module or the charging pre-charging module, or may cooperate with the main positive pre-charging module or the charging pre-charging module to realize hierarchical pre-charging.

In addition, the charging pre-charging module comprises a charging pre-charging switch and a first resistor network connected in series; the main positive pre-charging module comprises a main positive pre-charging switch and a second resistor network connected in series.

In addition, the main negative pre-charging module comprises a main negative pre-charging switch and a third resistor network connected in series.

In addition, the pre-charging circuit for the high voltage battery pack further comprises a first current detecting module; the second end of the charging switching module is connected to the charging connection end through the first current detecting module, the first current detecting module is connected to the control module; the control module reports an over-current fault when determining that a current value detected by the first current detecting module exceeds a first threshold. In this implementation, the over-current problem occurred in the charging process may be detected and reported in time.

In addition, the pre-charging circuit for the high voltage battery pack further comprises a second current detecting module; the second end of the main positive switching module is connected to the main positive connection end through the second current detecting module, the second current detecting module is connected to the control module; the control module reports an over-current fault when determining that a current value detected by the second current detecting module exceeds a second threshold. In this implementation, the over-current defect occurred in the discharging process may be detected and reported in time.

In addition, the pre-charging circuit for the high voltage battery pack further comprises a third current detecting module; the second end of the main negative switching module is connected to the main negative connection end through the third current detecting module, and the third current detecting module is connected to the control module; during a charging process, the control module reports an over-current fault when determining that a current value detected by the third current detecting module exceeds the first threshold; during a discharging process, the control module reports an over-current fault when determining that the current value detected by the third current detecting module exceeds the second threshold.

In addition, the pre-charging circuit for the high voltage battery pack further comprises a charging module and a discharging module; a first end of the charging module is connected to the charging connection end, a second end of the charging module is connected to the main negative connection end, and a first end of the discharging module is connected to the main positive connection end, a second end of the discharging module is connected to the main negative connection end.

In addition, the discharging module comprises N load sub-modules, and the pre-charging circuit for the high voltage battery pack further comprises N fourth current detecting modules, and the N load sub-modules and the N fourth current detecting modules are in one-to-one correspondence; wherein, a first end of each of the load sub-modules is connected to a second end of corresponding fourth current detecting module through a load switch, a first end of each of the fourth current detecting modules is connected to the main positive connection end, a second end of each of the load sub-modules is connected to the main negative connection end; each of the fourth current detecting modules is connected to the control module; during a discharging process, the control module reports an over-current fault when determining that a current value detected by the fourth current detecting module exceeds a third threshold; wherein, N is a positive integer. In this implementation, the over-current defect occurred in the discharging process may be detected and reported in time.

In addition, the pre-charging method further comprises: switching on the main negative switching module, before controlling the charging pre-charging module to be switched on, or before controlling the main positive pre-charging module to be switched on.

In addition, the pre-charging circuit for the high voltage battery pack further comprises a main negative pre-charging module connected in parallel with the main negative switching module; during a charging process, the pre-charging method further comprises during a charging process, the pre-charging method further comprises performing the following steps before detecting the voltage at the first end of the charging switching module and the voltage at the second end at the charging switching module: controlling the main negative pre-charging module to be switched on; detecting a voltage at the first end of the main negative switching module and a voltage at the second end of the main negative switching module; determining if the voltage at the first end of the main negative switching module and the voltage at the second end at the main negative switching module conform with a third constraint relationship; and if so, switching on the main negative switching module, and switching off the main negative pre-charging module; during a discharging process, the pre-charging method further comprises, performing the following steps before detecting the voltage at the first end of the main positive switching module and the voltage at the second end of the main positive switching module: controlling the main negative pre-charging module to be switched on; detecting a voltage at the first end of the main negative switching module and a voltage at the second end of the main negative switching module; determining if the voltage at the first end of the main negative switching module and the voltage at the second end of the main negative switching module conform with the third constraint relationship; and if so, switching on the main negative switching module, and switching off the main negative pre-charging module. In this implementation, hierarchical pre-charging can be achieved.

In addition, the pre-charging circuit for the high voltage battery pack further comprises a main negative pre-charging module connected in parallel with the main negative switching module; during a charging process, the pre-charging method further comprises controlling the main negative pre-charging module to be switched on before detecting the voltage at the first end of the charging switching module and the voltage at the second end at the charging switching module: and the pre-charging method further comprises performing the following steps, after switching on the charging switching module and switching off the charging pre-charging module: detecting a voltage at the first end of the main negative switching module and a voltage at the second end of the main negative switching module; determining if the voltage at the first end of the main negative switching module and the voltage at the second end at the main negative switching module conform with a third constraint relationship; and if so, switching on the main negative switching module, and switching off the main negative pre-charging module; and during a discharging process, the pre-charging method further comprises controlling the main negative pre-charging module to be switched on, before detecting the voltage at the first end of the main positive switching module and the voltage at the second end of the main positive switching module; and the pre-charging method further comprises performing the following steps, after switching on the main positive switching module and switching off the main positive pre-charging module: detecting a voltage at the first end of the main negative switching module and a voltage at the second end of the main negative switching module; determining if the voltage at the first end of the main negative switching module and the voltage at the second end of the main negative switching module conform with the third constraint relationship; and if so, switching on the main negative switching module, and switching off the main negative pre-charging module. In this implementation, hierarchical pre-charging can be achieved.

In addition, the pre-charging method further comprises: determining that an insulation resistance of the high voltage battery pack conforms with a preset requirement, before controlling the charging pre-charging module to be switched on, or before controlling the main positive pre-charging module to be switched on. In this implementation, the control module performs charging or discharging after the insulation resistance of the high voltage battery pack conforms with the preset requirement, thereby improving safety.

In addition, the pre-charging circuit for the high voltage battery pack further comprises a first current detecting module; a second end of the charging switching module is connected to the charging connection end through the first current detecting module, and the first current detecting module is connected to the control module; during a charging process, the pre-charging method further comprises: reporting an over-current fault when determining that a current value detected by the first current detecting module exceeds a first threshold, after switching on the charging switching module and switching off the charging pre-charging module.

In addition, the pre-charging circuit for the high voltage battery pack further comprises a second current detecting module; a second end of the main positive switching module is connected to the main positive connection end through the second current detecting module, and the second current detecting module is connected to the control module; during a discharging process, the pre-charging method further comprises: reporting an over-current fault when determining that a current value detected by the second current detecting module exceeds a second threshold, after switching on the main positive switching module and switching off the main positive pre-charging module.

In addition, the pre-charging circuit for the high voltage battery pack further comprises a third current detecting module; a second end of the main negative switching module is connected to the main negative connection end through the third current detecting module, and the third current detecting module is connected to the control module; during a charging process, after switching on the charging switching module and switching off the charging pre-charging module, the pre-charging method further comprises: reporting an over-current fault when determining that a current value detected by the third current detecting module exceeds the first threshold; during a discharging process, the pre-charging method further comprises: reporting an over-current fault when determining that the current value detected by the third current detecting module exceeds the second threshold, after switching on the main positive switching module and switching off the main positive pre-charging module.

In addition, the pre-charging circuit for the high voltage battery pack further comprises a discharging module and N fourth current detecting modules, the discharging module comprises N load sub-modules, and the N load sub-modules and the N fourth current detecting modules are in one-to-one correspondence; a first end of each of the load sub-modules is connected to a second end of corresponding fourth current detecting module through a load switch, a first end of each of the fourth current detecting modules is connected to the main positive connection end, a second end of each of the load sub-modules is connected to the main negative connection end; each of the fourth current detecting modules is connected to the control module; during a discharging process, after switching on the main positive switching module and switching off the main positive pre-charging module, the pre-charging method further comprises: reporting an over-current fault when determining that a current value detected by the fourth current detecting module exceeds a third threshold.

The pre-charging circuit and a pre-charging method for a high voltage battery pack according to the present invention avoid a large current generated at the moment when the charging switching module and the main positive switching module are switched on, due to an excessive voltage differences across the charging switching module and the main positive switching module, thereby avoiding the influence of large current on life and controllability of the charging switching module and the main positive switching module.

BRIEF DESCRIPTION OF THE DRAWINGS

One or more embodiments are illustrated by figures in the drawings corresponding thereto. The exemplary descriptions do not constitute a limitation on the embodiments, and elements in the drawings having the same reference numerals represent like elements, figures in the drawings do not constitute a scale limitation unless otherwise stated.

DETAILED DESCRIPTION

Embodiments of the present disclosure will be described in detail below with reference to the accompanying drawings to make the objects, technical solutions and advantages of the embodiments of the present disclosure more clear. However, it will be appreciated by those skilled in the art that, in the various embodiments of the present disclosure, numerous technical details are set forth to facilitate understanding of the present application by readers. However, the technical solutions claimed in the present application may be implemented without these technical details and various changes and modifications based on the following embodiments.

The serial numbers per se made for the components herein, such as "first", "second", etc., are only used to distinguish the described objects, which do not intend to limit the order or express specific technical meaning. As used herein, the term "connected" or "coupled" has meanings of both direct and indirect connections (couples) unless otherwise specified.

Figure 1:
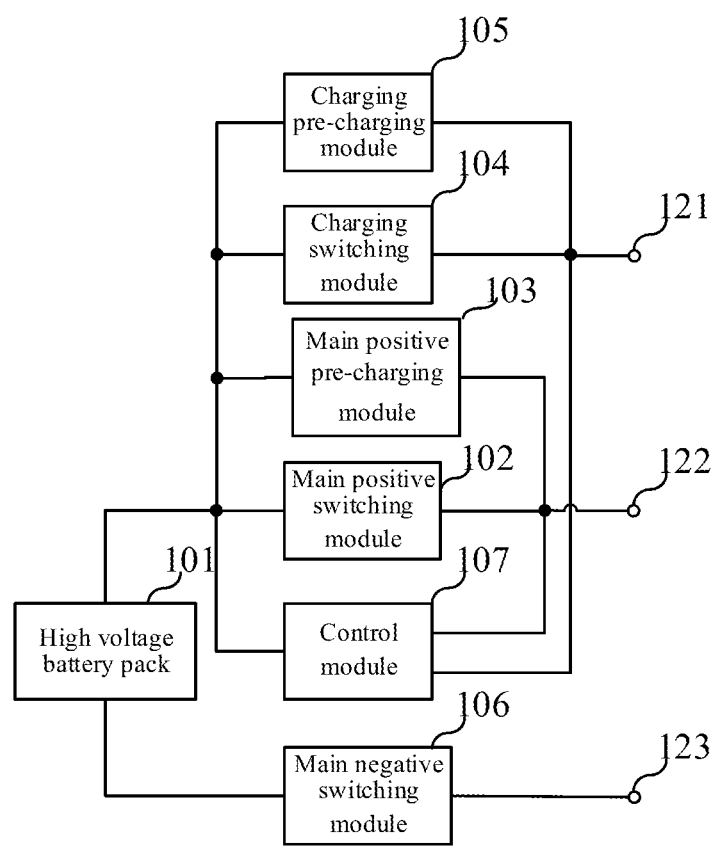
FIG. 1 is a schematic structural diagram of a pre-charging circuit for a high voltage battery pack according to an embodiment of the present disclosure.

The first embodiment of the present disclosure relates to a pre-charging circuit for the high voltage battery pack, as shown in FIG. 1, the pre-charging circuit comprises: a high voltage battery pack 101, a main positive switching module 102, a main positive pre-charging module 103, a charging switching module 104, a charging pre-charging module 105, a main negative switching module 106 and a control module 107. The positive electrode of the high voltage battery pack 101 is connected to the first end of the main positive switching module 102 and the first end of the charging switching module 104, respectively, the negative electrode of the high voltage battery pack 101 is connected to the first end of the main negative switching module 106; the second end of the main positive switching module 102 is connected to the main positive connection end 122 of the pre-charging circuit, the second end of the charging switching module 104 is connected to the charging connection end 121 of the pre-charging circuit, and the second end of the main negative switching module 106 is connected to the main negative connection end 123 of the pre-charging circuit. The main positive pre-charging module 103 is connected in parallel with the main positive switching module 102, and the charging pre-charging module 105 is connected in parallel with the charging switching module 104. During a charging process, the control module 107 controls the charging pre-charging module 105 to be switched on, detects the voltage at the first end of the charging switching module 104 and the voltage at the second end of the charging switching module 104, after determining that the voltage at the first end of the charging switching module 104 and the voltage at the second end of the charging switching module 104 conform with a first constraint relationship, the charging switching module 104 is switched on and the charging pre-charging module 105 is switched off. During a discharging process, the control module 107 controls the main positive pre-charging module 103 to be switched on, detects the voltage at the first end of the main positive switching module 102 and the voltage at the second end of the main positive switching module 102, after determining that the voltage at the first end of the main positive switching module 102 and the voltage at the second end of the main positive switching module 102 conform with a second constraint relationship, the main positive switching module 102 is switched on and the main positive pre-charging module 103 is switched off.

In addition, during the charging process, the control module 107 may control the main negative switching module 106 to be switched on before controlling the charging pre-charging module 105 to be switched on. Alternatively, the control module 107 may simultaneously switches on the main negative switching module 106 and the charging pre-charging module. Alternatively, the control module 107 may control the main negative switching module 106 to be switched on after controlling the charging pre-charging module 105 to be switched on.

During the discharging process, the control module 107 may control the main negative switching module 106 to be switched on before controlling the main positive switching module 103 to be switched on. Alternatively, the control module 107 may simultaneously switches on the main negative switching module 106 and the main positive switching module 103. Alternatively, the control module may control the main negative switching module 106 to be switched on after controlling the main positive switching module 103 to be switched on.

Figure 2:
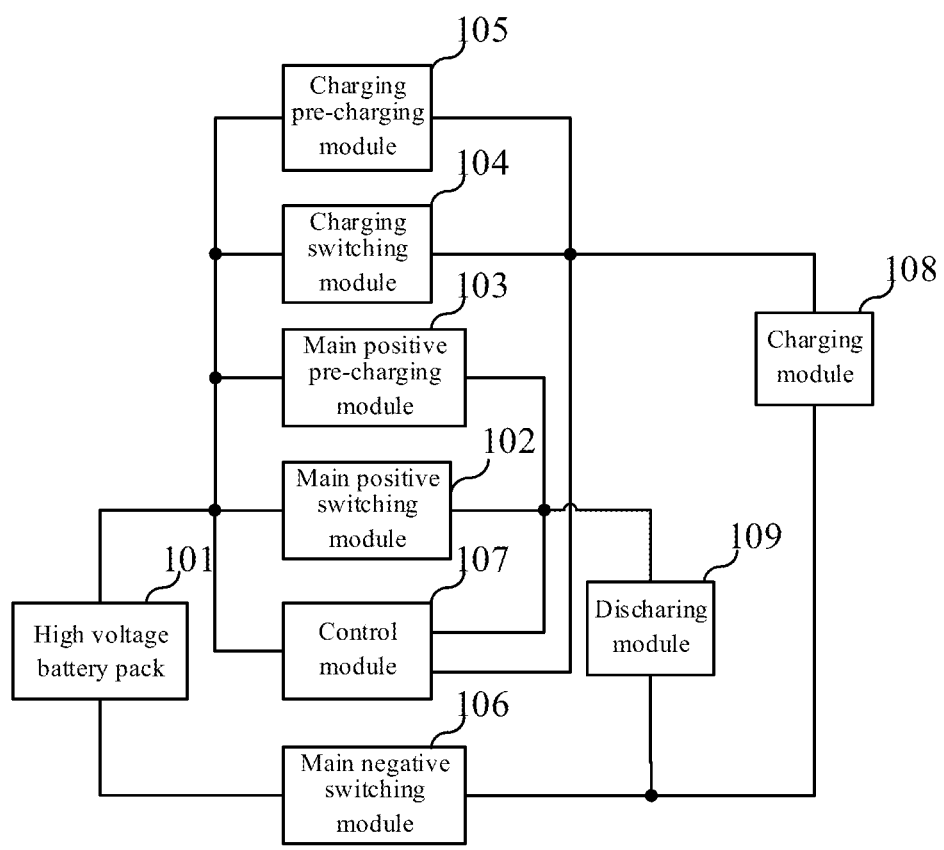
FIG. 2 is a schematic structural diagram of a pre-charging circuit for a high voltage battery pack in a specific implementation according to the embodiment of the present disclosure.

In one example, the pre-charging circuit for the high voltage battery pack is shown in FIG. 2, and the pre-charging circuit further comprises a charging module 108 and a discharging module 109; the first end of the charging module 108 is connected to the charging connection end 121, and the second end of the charging module 108 is connected to the main negative connection end 123, the first end of the discharging module 109 is connected to the main positive connection end 122, and the second end of the discharging module 109 is connected to the main negative connection end 123.

In one example, when detecting the voltage at the first end of the main positive switching module 102, the voltage at the second end of the main positive switching module 102, the voltage at the first end of the charging switching module 104, and the voltage at the second end of the charging switching module 104, the first end of the main negative switching module 106 is taken as a reference ground.

In one example, the charging pre-charging module 105 comprises a charging pre-charging switch and a first resistor network connected in series. The main positive pre-charging module 103 comprises a main positive pre-charging switch and a second resistor network connected in series.

In one example, the first resistor network may be a first resistor and the second resistor network may be a second resistor. By adjusting the resistance of the first resistor, the pre-charging time of the capacitive component across the charging module may be changed. If the resistance of the first resistor is increased, the current in a branch of the charging pre-charging module 105 is reduced, and the pre-charging time of the capacitive component across the charging module is increased. If the resistance of the first resistor is reduced, the current in the branch of the charging pre-charging module 105 is increased, and the pre-charging time of the capacitive component across the charging module is reduced. By adjusting the resistance of the second resistor, the pre-charging time of the capacitive component across the discharging module may be changed. If the resistance of the second resistor is increased, the current in a branch of the main positive pre-charging module 103 is reduced, and the pre-charging time of the capacitive component across the discharging module is increased. If the resistance of the second resistor is reduced, the current in the branch of the main positive pre-charging module 103 is increased, and the pre-charging time of the capacitive component across the discharging module is reduced.

It should be noted that, as can be understood by those skilled in the art, the capacitive component across the charging module may be a capacitor connected between the first end of the charging module and the second end of the charging module, and the capacitive component across the discharging module may be a capacitor connected between the first end of the discharging module and the second end of the discharging module.

It is worth mentioning that the high voltage battery pack pre-charges the capacitive component across the discharging module through the main positive pre-charging module, reducing the difference between the voltage at the first end of the main positive switching module and the voltage at the second end of the main positive switching module, such that an excessive inrush current will not be generated at the moment when the main positive switching module is switched on, and the influence of excessive surge current on the life and stability of the main positive switching module is avoided.

It is worth mentioning that the high voltage battery pack pre-charges the capacitive component across the charging module through the charging pre-charging module, reducing the difference between the voltage at the first end of the charging switching module and the voltage at the second end of the charging switching module, such that an excessive inrush current will not be generated at the moment when the charging switching module is switched on, and the influence of excessive surge current on the life and stability of the charging switching module is avoided.

Those skilled in the art will appreciate that, in practical applications, the first constraint relationship may be that the voltage at the second end of the charging switching module 104 is not less than k times the voltage at the first end of the charging switching module 104, where k is a positive number less than 1. The second constraint relationship may be that the voltage at the second end of the main positive switching module 102 is not less than t times the voltage at the first end of the main positive switching module 102, where t is a positive number less than 1. In the specific implementation, the values of k and t may be same or different, and the specific values may be set according to the specific structure of the pre-charging circuit for the high voltage battery pack, the parameters of individual components, etc.

The control logic of the pre-charging circuit for the high voltage battery pack will be illustrated below in conjunction with the specific circuit diagram of the pre-charging circuit for the high voltage battery pack.

Figure 3:
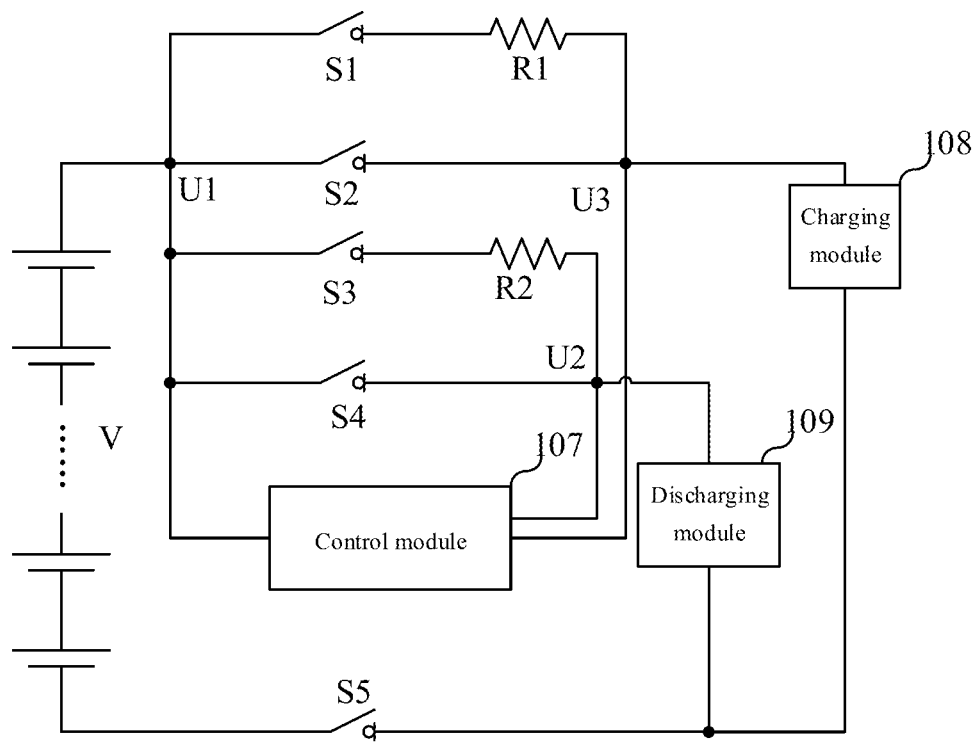
FIG. 3 is a circuit diagram of the pre-charging circuit for a high voltage battery pack according to the embodiment of the present disclosure.

In one example, the circuit diagram of the pre-charging circuit for the high voltage battery pack is shown in FIG. 3. In the figure, V represents the high voltage battery pack, S1 represents the charging pre-charging switch, S2 represents the charging switching module, S3 represents the main positive pre-charging switch, S4 represents the main positive switching module, S5 represents the main negative switching module, and R1 represents the first resistor network, and R2 represents a second resistor network. U1 represents the voltage at the first end of the main positive switching module and the voltage at the first end of the charging switching module, U2 represents the voltage at the second end of the main positive switching module, and U3 represents the voltage at the second end of the charging switching module. Optionally, the charging module may be a fast charging socket, and the discharging module may be a power consumption apparatus for vehicle, such as a motor, an air conditioner, an inverter, etc. Optionally, the first constraint relationship is that the voltage at the second end of the charging switching module is 0.8 times the voltage at the first end of the charging switching module, and the second constraint relationship is that the voltage at the first end of the main positive switching module is 0.8 times the voltage at the second end of the main positive switching module.

During rapid charging of the high voltage battery pack, the control module switches on S1 and S5, and the high voltage battery pack charges the capacitive component across the charging module. The control module performs voltage sampling on U1 and U3, and when U1 and U3 conform with the first constraint relationship, the control module switches on S2 and switches off S1, and the charging module charges the high voltage battery pack. It can be seen from the above that when a charging pre-charging module is provided, the voltage difference between U1 and U3 would not be too big, and a large inrush current would not be generated at the moment when S2 is switched on, such that the life of S2 will not be affected, nor the life of capacitive component inside the fast charging socket, thereby protecting S2 and the capacitive component inside the fast charging socket.

During the discharging of the high voltage battery pack, the control module switches on S3 and S5, and the high voltage battery pack charges the capacitive component across the discharging module, for example, the X capacitor across the discharging module. The control module performs voltage sampling on U1 and U2, and when U1 and U2 conform with the second constraint relationship, the control module switches on S4 and switches off S3, and the high voltage battery pack discharges through the discharging module. It can be seen from the above that when a main positive pre-charging module is provided, the voltage difference between U1 and U2 would not be too big, and a large inrush current will not be generated at the moment when S4 is switched on, such that the life of S4 will not be affected, nor the life of capacitive component inside the discharging module, thereby protecting S4 and the capacitive component inside power consumption apparatus are protected.

It should be noted that, as can be understood by those skilled in the art, the above examples are merely illustrative. In practical applications, the pre-charging circuit for the high voltage battery pack may have other circuit configurations.

Figure 4:
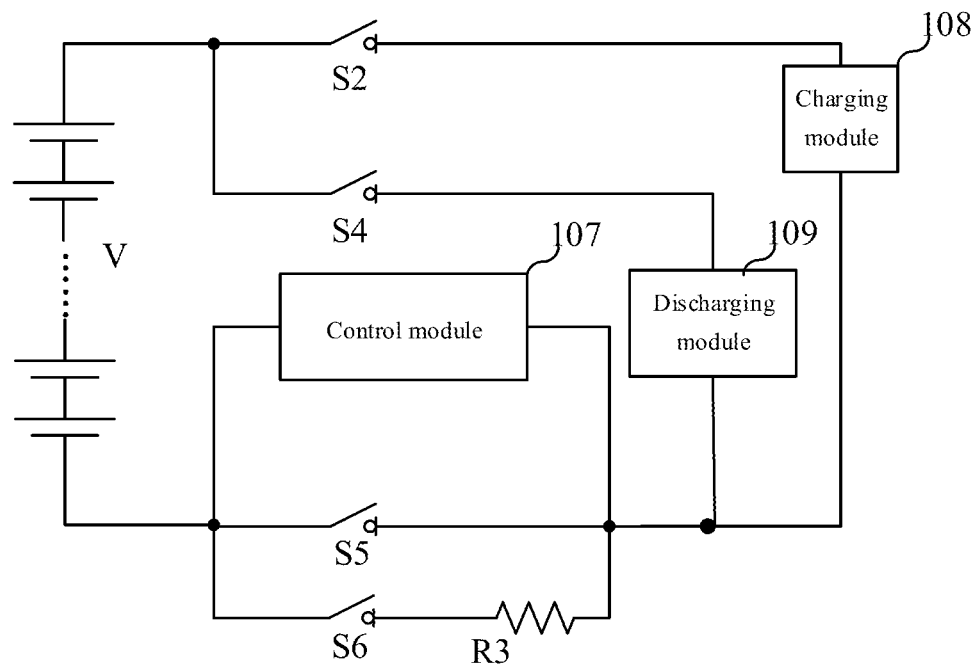
FIG. 4 is a circuit diagram of a pre-charging circuit for another high voltage battery pack according to the embodiment of the present disclosure.

For example, the pre-charging circuit for the high voltage battery pack comprises a high voltage battery pack, a charging switching module, a main positive switching module, a main negative switching module, and a main negative pre-charging module, wherein the positive electrode of the high voltage battery pack is connected to the first end of the main positive switching module and the first end of the charging switching module respectively, the negative electrode of the high voltage battery pack is connected to the first end of the main negative switching module; the second end of the main positive switching module is connected to the first end of the discharging module, the second end of the charging switching module is connected to the first end of the charging module, and the second end of the charging module and the second end of the discharging module are connected to the second end of the main negative switching module, respectively. The main negative pre-charging module is connected in parallel with the main negative switching module, and the main negative pre-charging module comprises a main negative pre-charging switch and a third resistor network. The circuit diagram of the pre-charging circuit is shown in FIG. 4. In FIG. 4, V represents the high voltage battery pack, S2 represents the charging switching module, S4 represents the main positive switching module, S5 represents the main negative switching module, S6 represents the main negative pre-charging switch, and R3 represents the third Resistance network. During the charging and discharging, the control module firstly controls S6 to be switched on, and after the voltage at the second end of the main negative switching module is 0.8 times the voltage at the first end of the main negative switching module, S5 is switched on and S6 is switched off.

In one example, the control module determines if the insulation resistance of the high voltage battery pack conforms with a preset requirement before controlling the main positive pre-charging module to be switched on, or before controlling the charging pre-charging module to be switched on, that is, in the implementation, if the insulation resistance of the high voltage battery pack is within a safe range, so as to ensure the safety of the pre-charging circuit for the high voltage battery pack. The safety range of insulation resistance may be set according to specific requirements.

In one example, the pre-charging circuit for the high voltage battery pack further comprises a first current detecting module 111; a second end of the charging switching module is connected to a charging connection end 121 through the first current detecting module 111, and the first current detecting module 111 is connected to the control module 107; the control module 107 reports an over-current fault when determining that the current value detected by the first current detecting module 111 exceeds a first threshold.

In one example, the pre-charging circuit for the high voltage battery pack further comprises a second current detecting module 112. A second end of the main positive switching module is connected to the main positive connection end 122 through the second current detecting module 112. The second current detecting module 112 is connected to the control module 107. The control module 107 reports an over-current fault when determining that the current value detected by the second current detecting module 112 exceeds a second threshold.

In one example, the pre-charging circuit for the high voltage battery pack further comprises a third current detecting module 113; a second end of the main negative switching module is connected to the main negative connection terminal 123 through the third current detecting module 113; the third current detecting module 113 is connected to the control module 107. During the charging, the control module 107 reports an over-current fault when determining that the current value detected by the third current detecting module 113 exceeds the first threshold; during the discharging, the control module 107 reports an over-current fault when determining that the current value detected by the third current detecting module 113 exceeds the second threshold.

Figure 5:
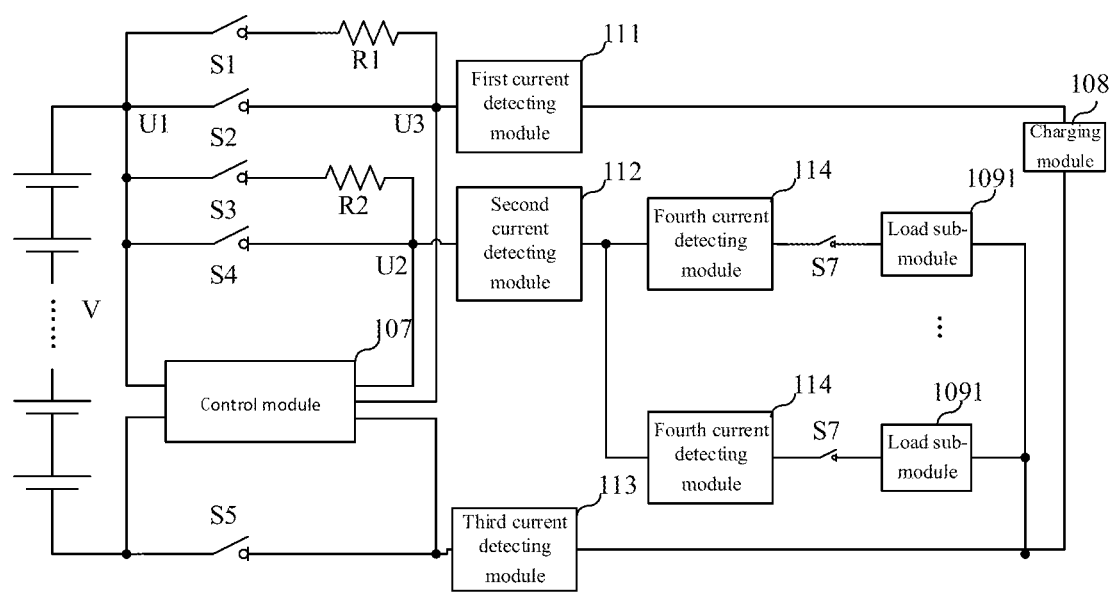
FIG. 5 is a circuit diagram of a pre-charging circuit for still another high voltage battery pack according to the embodiment of the present disclosure.

In one example, as shown in FIG. 5, the discharging module comprises N load sub-modules 1091, and the pre-charging circuit for the high voltage battery pack further comprises N fourth current detecting modules 114, the N load sub-modules 1091 and the N fourth current detecting modules 114 are in one-to-one correspondence. A first end of each load sub-modules 1091 is connected to a second end of the corresponding fourth current detecting module 114 through a load switch S7, and a first end of the fourth current detecting module 114 is connected to the main positive connection end 122. A second end of each load sub-module 1091 is connected to the main negative connection end 123; each fourth current detecting module 114 is connected to the control module 107 respectively (not shown); and during the discharging, the control module 107 reports an over-current fault when determining that the current value detected by the fourth current detecting module 114 exceeds a third threshold; where N is a positive integer.

It is worth mentioning that the control module could detect an over-current fault and thus avoiding the effect of the over-current fault on the high voltage battery pack.

It should be noted that, as can be understood by those skilled in the art, the first threshold, the second threshold, and the third threshold may be determined according to an operating current, a maximum current value, or other parameters of respective components in the pre-charging circuit for the high voltage battery pack. The specific values of the first threshold, the second threshold, and the third threshold are not limited in the present embodiment.

It should be noted that, as can be understood by those skilled in the art, after reporting an over-current fault, the control module may selectively perform strategies, such as switching off a corresponding switch, reducing power, etc.

It is worth mentioning that the control module may report an over-current fault in time when the current flowing through the branch of any of the main positive switching module, the charging switching module, the main negative switching module and respective load switches is located is too large, such that the control module may take measures in time to prevent the current from being too large and thereby damaging the switching modules in the high voltage battery pack and the circuit.

It should be noted that the first current detecting module, the second current detecting module, the third current detecting module, and the fourth current detecting module may be current sensors, or may be other circuits capable of detecting current, and the types of the current detecting module, the second current detecting module, the third current detecting module, and the fourth current detecting module are not limited in the present embodiment.

In one example, since the charging switching module and the main positive switching module are provided with a current detecting module respectively, both the current of the charging branch and the current of the discharging branch may be detected when charging and discharging take place simultaneously, thereby obtaining the actual current flowing into the high voltage battery pack.

It is worth mentioning that each module involved in this embodiment is a logic module, and in practical applications, a logical unit may be implemented by a physical unit, a part of a physical unit, or a combination of multiple physical units. In addition, in order to highlight the innovative part of the present disclosure, the present embodiment does not introduce a unit that is less closely related to the technical problem to be solved by the present disclosure, but it does not mean that there are no other units existing in the present embodiment.

It should be noted that the above is merely illustrative, which does not limit the technical solution of the present disclosure.

Compared with the prior art, the present embodiment provides a pre-charging circuit for the high voltage battery pack. During the charging, the high voltage battery pack pre-charges the capacitive component of the charging module through the charging pre-charging module, and the charging switching module is switched on after determining that the voltage at the first end of the charging switching module and the voltage at the second end of the charging switching module conform with the first constraint relationship, thereby reducing the difference between the voltage at the first end of the charging switching module and the voltage at the second end of the charging switching module. As the difference between the voltage at the first end of the charging switching module and the voltage at the second end of the charging switching module is reduced, an excessive inrush current would not be generated at the moment when the charging switching module is switched on, and the life of the charging switching module would not be affected, thereby avoiding the problem that the charging switching module is conglutinated due to frequent generation of large inrush current, such that the control module cannot control the charging switching module to be switched off, and thus improving the safety of high voltage battery pack and electric vehicles. During the discharging, the high voltage battery pack pre-charges the capacitive component of the charging module through the main positive pre-charging module, and the main positive switching module is switched on after determining that the voltage at the first end of the main positive switching module and the voltage at the second end of the main positive switching module comply with the second constraint relationship, thereby reducing the difference between the voltage at the first end of the main positive switching module and the voltage at the second end of the main positive switching module. As the difference between the voltage at the first end of the main positive switching module and the voltage at the second end of the main positive switching module is reduced, an excessive inrush current would not be generated at the moment when the main positive switching module is switched on, and the life of the main positive switching module would not be affected, thereby avoiding the problem that the main positive switching module is conglutinated due to frequent generation of large inrush current, such that the control module cannot control the main positive switching module to be switched off, and thus improving the safety of high voltage battery pack and electric vehicles.

Another embodiment of the present disclosure relates to a pre-charging circuit for the high voltage battery pack and is further improved on the basis of the embodiment described with reference to FIGS. 1-5, and the specific improvement is that a main negative pre-charging module is provided for the main negative switching module and the main negative pre-charging module may be used as a backup pre-charging module or a pre-charging circuit for the high voltage battery pack to realize hierarchical pre-charging.

Figure 6:
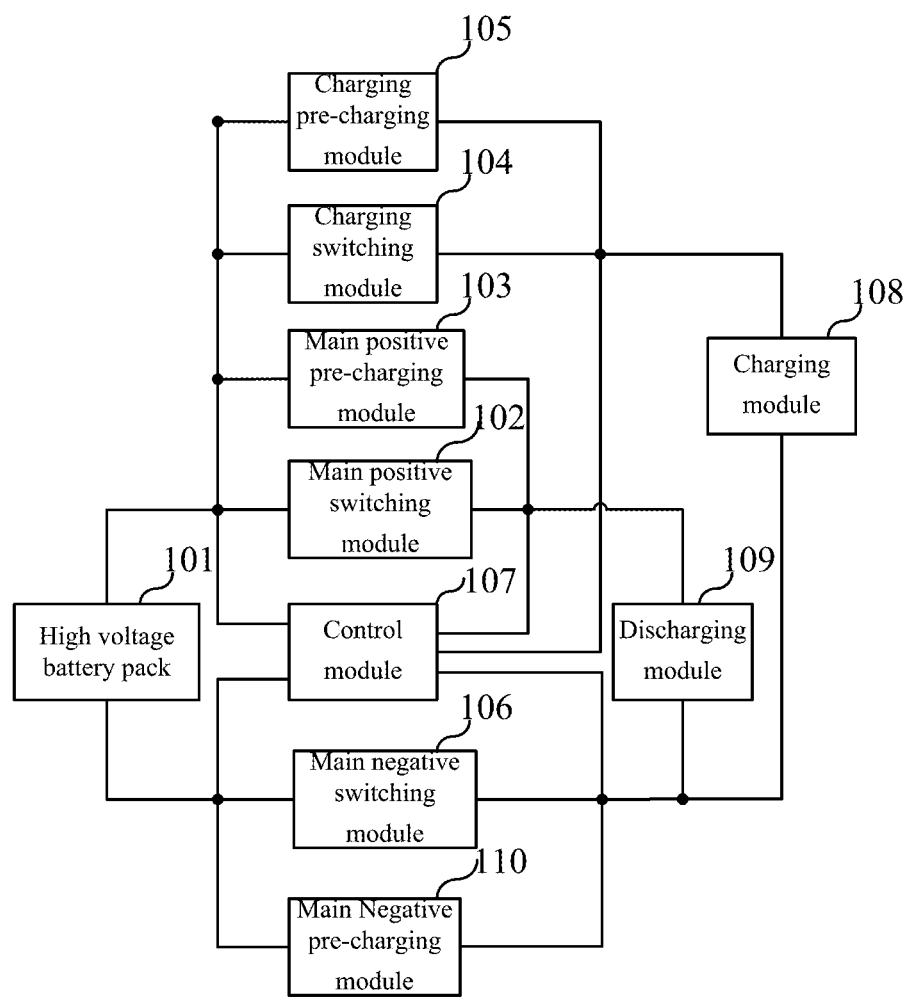
FIG. 6 is a schematic structural diagram for a pre-charging circuit of a high voltage battery pack according to another embodiment of the present disclosure.

Specifically, as shown in FIG. 6, the pre-charging circuit for the high voltage battery pack further comprises a main negative pre-charging module 110 connected in parallel with the main negative switching module 106.

In one example, the primary negative pre-charging module 110 is used as a backup pre-charging module. When a fault occurs in the main positive pre-charging module 103 or the charging pre-charging module 105, the pre-charging circuit for the high voltage battery pack performs pre-charging through the main negative pre-charging module 110.

It is worth mentioning that, since the pre-charging circuit for the high voltage battery pack is provided with the main negative pre-charging module, the pre-charging effect may be achieved by the main negative pre-charging module when a fault occurs in the main positive pre-charging module or the charging pre-charging module, thereby improving the reliability of the pre-charging circuit for the high voltage battery pack.

In another example, the main negative pre-charging module 110 cooperates with the main positive pre-charging module 103 and the charging pre-charging module 105 respectively, to achieve hierarchical pre-charging in a discharging process and hierarchical pre-charging in a charging process.

Figure 7:
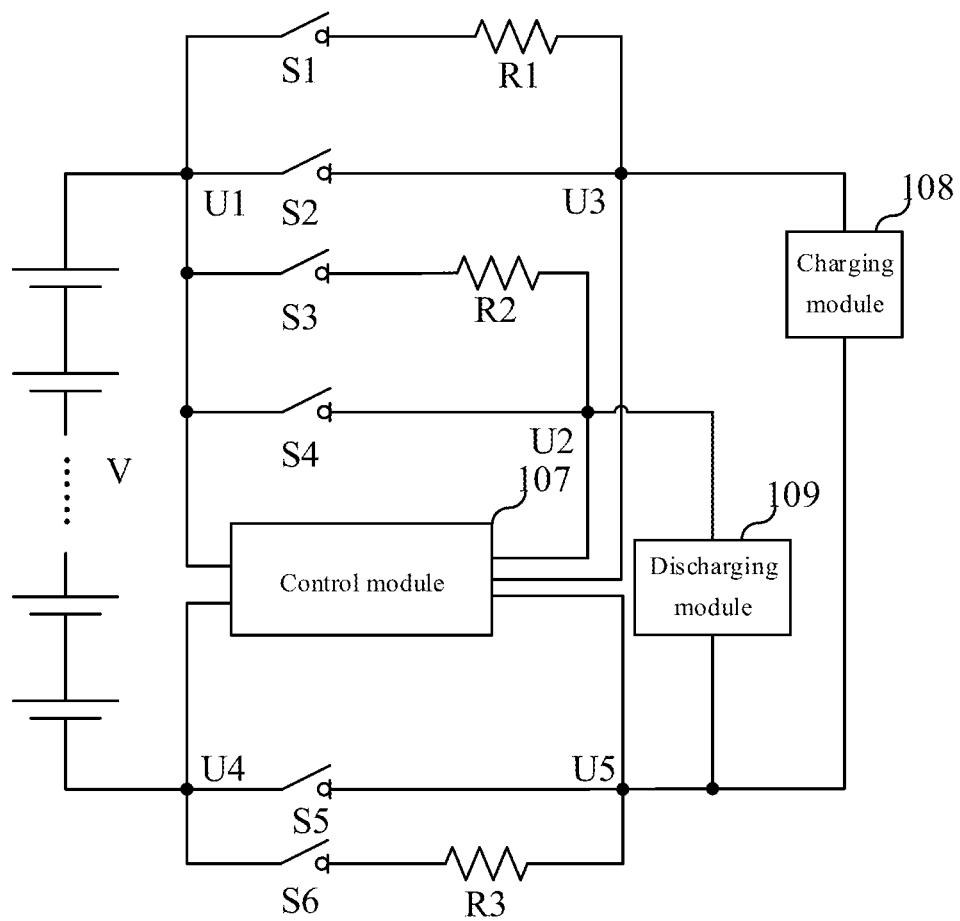
FIG. 7 is a circuit diagram of the pre-charging circuit for a high voltage battery pack according to the another embodiment of the present disclosure.

In one example, the main negative pre-charging module comprises a main negative pre-charging switch and a third resistor network connected in series, and the circuit diagram of the pre-charging circuit for the high voltage battery pack is shown in FIG. 7. Wherein, V represents a high voltage battery pack, S1 represents a charging pre-charging switch, R1 represents a first resistor network, S2 represents a charging switching module, S3 represents a main positive pre-charging switch, R2 represents a second resistor network, S4 represents a main positive switch module, S5 represents a main negative switching module, S6 represents a main negative pre-charging switch, and R3 represents a third resistor network. U1 represents the voltage at the first end of the charging switching module and the voltage at the first end of the main positive switching module, U2 represents the voltage at the second end of the main positive switching module, U3 represents the voltage at the second end of the charging switching module, U4 represents the voltage at the first end of the main negative switching module, U5 represents the voltage at the second end of the main negative switching module.

Figure 8:
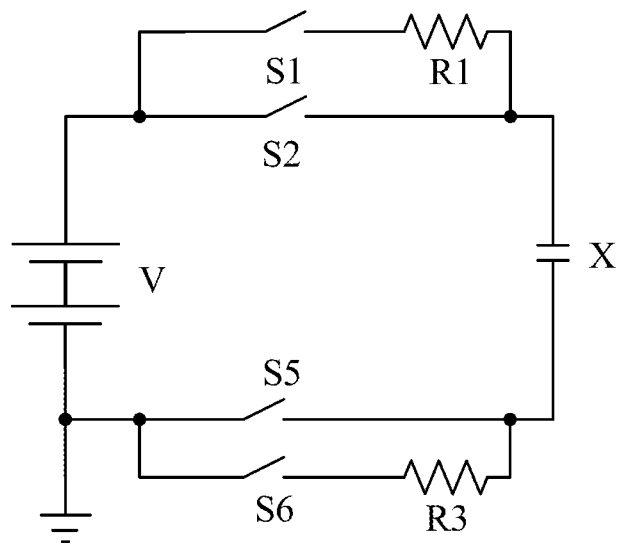
FIG. 8 is a simulation diagram of a pre-charging circuit for a high voltage battery pack that employs hierarchical pre-charging according to the another embodiment of the present disclosure.
Figure 9:
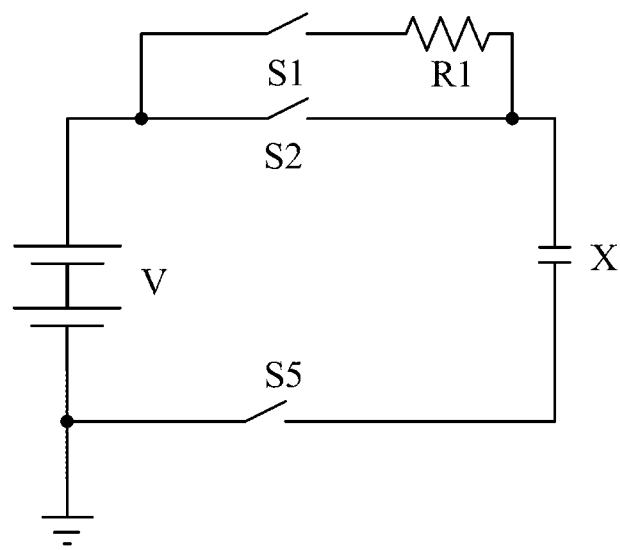
FIG. 9 is a simulation diagram of a pre-charging circuit for a high voltage battery pack that does not employ hierarchical pre-charge according to the another embodiment of the present disclosure.
Figure 10:
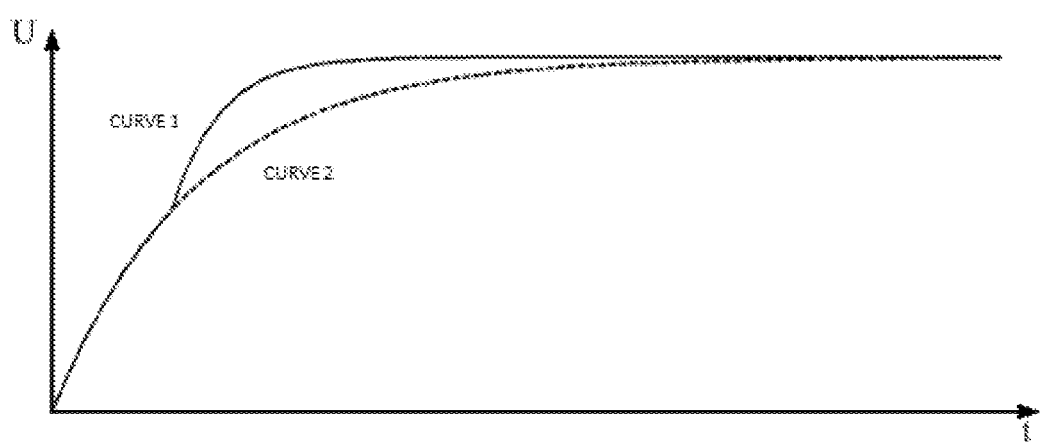
FIG. 10 is a simulation diagram of two charging circuits according to the another embodiment of the present disclosure.

During a charging process, when performing hierarchical pre-charging, S1 and S5 are firstly switched on, and the control module continuously performs voltage sampling on U4 and U5. When U4 and U5 conform with a third constraint relationship, for example, when U4 is 0.5 times U5, S6 is switched on and S5 is switched off. The control module detects U1 and U3, and when U3 is 0.8 times U1, S2 is switched on and S1 is switched off. At this time, the hierarchical pre-charging is completed. During the charging process, the simulation diagram of a pre-charging circuit for the high voltage battery pack that adopts hierarchical pre-charging is shown in FIG. 8, the simulation diagram of a pre-charging circuit for the high voltage battery pack that does not adopt hierarchical pre-charge is shown in FIG. 9, and the simulation results of the simulation diagrams shown in FIG. 8 and FIG. 9 are shown in FIG. 10. The pre-charging is mainly performed on a capacitive component across the charging module, as shown in FIG. 8 and FIG. 9, X represents the capacitive component across the charging module, V represents the high voltage battery pack, S1 represents the charging pre-charging switch, R1 represents a first resistor network, S2 represents the charging switching module, S5 represents the main negative switching module, S6 represents the main negative pre-charging switch, and R3 represents the third resistor network. In FIG. 10, abscissa (t) represents the charging time, ordinate (U) represents the voltage across X capacitor, curve 1 is a curve showing the simulation result when adopting hierarchical pre-charging, and curve 2 is a curve showing the simulation result not when hierarchical pre-charging is not adopted. As can be seen from FIG. 10, the pre-charging time of the charging circuit adopting hierarchical pre-charging is smaller than that of the charging circuit without hierarchical pre-charging.

During a discharging process, S3 and S6 are firstly switched on, and the control module continuously performs voltage sampling on U4 and U5. When U4 and U5 conforms with the third constraint relationship, for example, when U4 is 0.5 times U5, S5 is switched on and S6 is switched off. The control module detects U1 and U2, and when U2 is 0.8 times U1, S4 is switched on and S3 is switched off. At this time, the hierarchical pre-charging is completed.

It should be noted that, as can be understood by those skilled in the art, the third constraint relationship may be that the voltage at the first end U4 of the main negative switching module is not less than p times the voltage at the second end U5 of the main negative switching module, and p is a positive number less than 1. The specific value of p may be set according to the specific structure of the pre-charging circuit for the high voltage battery pack, the parameters of respective components, etc.

It should be noted that, as can be understood by those skilled in the art, the above-mentioned pre-charging method implemented through the pre-charging circuit for the high voltage battery pack is only an example, and in practical applications, the hierarchical pre-charging may also be implemented by other ways. For example, during the charging process, U1 and U3 may be sampled firstly, and after S2 is switched on according to the sampling result, U4 and U5 are then sampled. During the discharging process, U1 and U2 may be sampled firstly, and after S4 is switched on according to the sampling result, U4 and U5 are then sampled. The present embodiment does not limit the specific process of implementing hierarchical pre-charging.

In one example, when detecting the voltage at the first end of the main positive switching module 102, the voltage at the second end of the main positive switching module 102, the voltage at the first end of the charging switching module 104, and the voltage at the second end of the charging switching module 104, the first end of the main negative switching module 106 is taken as a reference ground; and when detecting the voltage at the first end of the main negative switching module 106 and the voltage at the second end of the main negative switching module 106, the voltage at the first end of the main positive switching module 102 is taken as a reference ground.

It is worth mentioning that each module involved in this embodiment is a logic module, and in practical applications, a logical unit may be implemented by a physical unit, a part of a physical unit, or a combination of multiple physical units. In addition, in order to highlight the innovative part of the present disclosure, the present embodiment does not introduce a unit that is less closely related to the technical problem to be solved by the present disclosure, but it does not mean that there are no other units existing in the present embodiment.

It should be noted that the above is merely illustrative and does not limit the technical solution of the present disclosure.

Compared with the prior art, in the pre-charging circuit for the high voltage battery pack provided in the present embodiment, the main negative pre-charging module is connected in parallel with the main negative switching module, such that the main negative pre-charging module may be used as a backup pre-charging module, or may be used to achieve hierarchical pre-charging. As the main negative pre-charging module is used as a backup pre-charging module, the pre-charging effect may be achieved by the main negative pre-charging module when a fault occurs in the main positive pre-charging module or the charging pre-charging module, thereby improving the reliability of the pre-charging circuit for the high voltage battery pack. The main negative pre-charging module cooperates with the main positive pre-charging module and the charging pre-charging module respectively, thereby realizing hierarchical pre-charging and reducing the pre-charging time.

Yet another embodiment of the present disclosure relates to a pre-charging method for the high voltage battery pack applied to the pre-charging circuit for the high voltage battery pack mentioned in the above embodiment.

Figure 11:
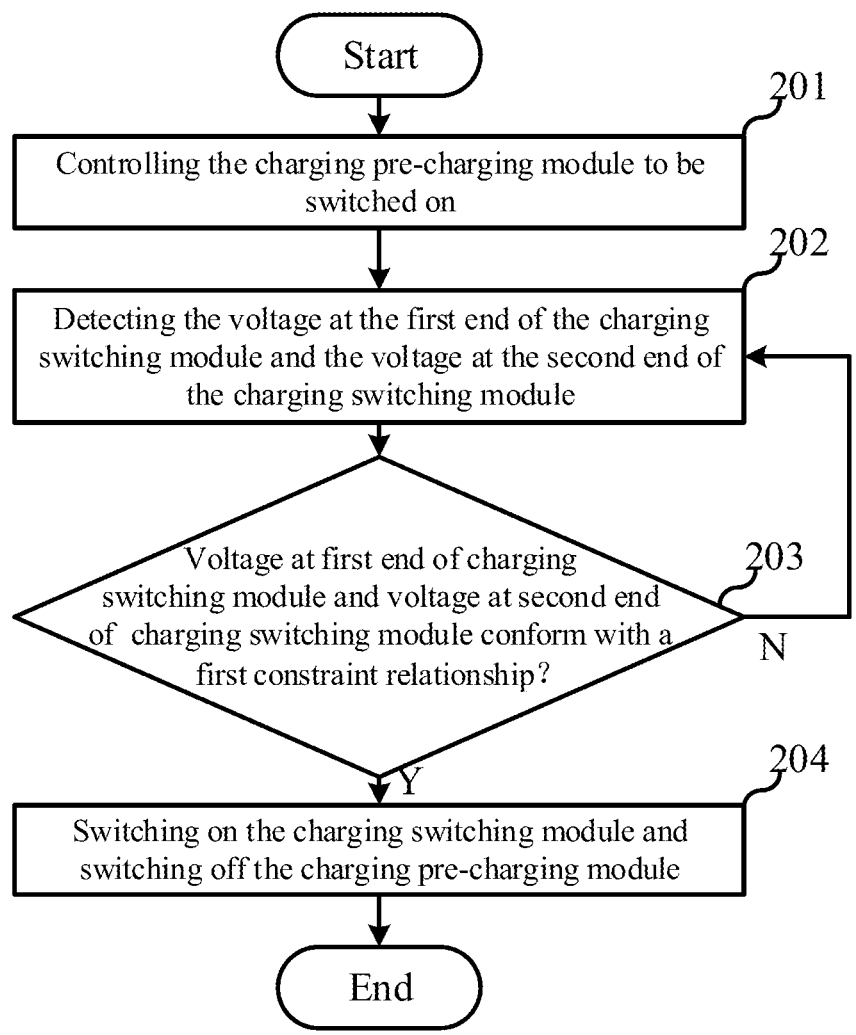
FIG. 11 is a flow chart of a pre-charging method in a charging process according to yet another embodiment of the present disclosure.

In a charging process, the pre-charging method for the high voltage battery pack is shown in FIG. 11, and method comprises the following steps:

Step 201: controlling the charging pre-charging module to be switched on.

In one example, the control module firstly switches on the main negative switching module and controls the charging pre-charging module to be switched on. Alternatively, the control module simultaneously switches on the main negative switching module and the charging pre-charging module. Alternatively, the control module firstly switches on the charging pre-charging module and then switches on the main negative switching module.

Step 202: detecting the voltage at the first end of the charging switching module and the voltage at the second end of the charging switching module.

Step 203: determining whether the voltage at the first end of the charging switching module and the voltage at the second end of the charging switching module conform with a first constraint relationship.

Specifically, after the control module determines that the voltage at the first end of the charging switching module and the voltage at the second end of the charging switching module conform with the first constraint relationship, step 204 is performed; otherwise, the process returns to step 202.

Step 204: switching on the charging switching module and switching off the charging pre-charging module.

Specifically, the pre-charging circuit for the high voltage battery pack further comprises a charging module, a first end of the charging module is connected to the charging connection end 121, and the main negative connection end is connected to a second end of the charging module. When the charging pre-charging module is switched on, the high voltage battery pack pre-charges a capacitive component across the charging module, and after the charging switching module is switched on, the charging module charges the high voltage battery pack.

In one example, the pre-charging circuit for the high voltage battery pack further comprises a first current detecting module, the second end of the charging switching module is connected to the charging connection end by the first current detecting module, and the first current detecting module is connected to the control module. The control module monitors the current of the branch of the charging switching module through the first current detecting module after the charging switching module is switched on and the charging pre-charging module is switched off. The control module reports an over-current fault when determining that the current value detected by the first current detecting module exceeds the first threshold.

In one example, after the over-current fault is reported, the control module reduces the current of the branch of the charging switching module by performing strategies, such as switching off the charging switching module or the main negative switching module, reducing power, etc.

Figure 12:
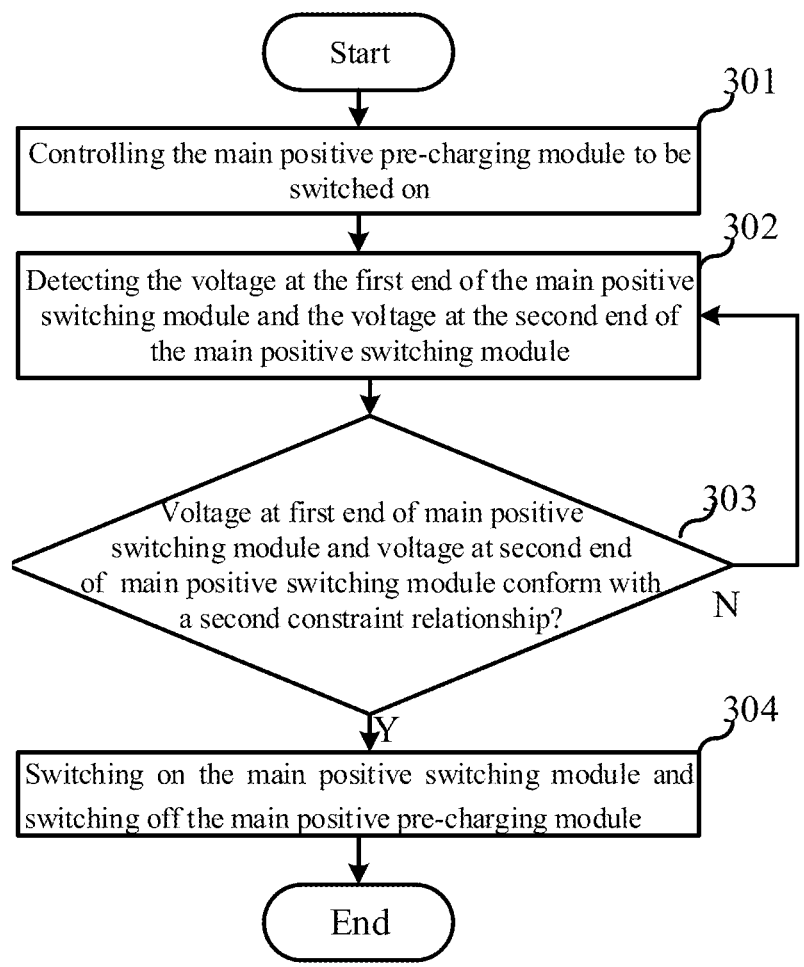
FIG. 12 is a flow chart of a pre-charging method in a discharging process according to the yet another embodiment of the present disclosure.

In a discharge process, the pre-charging method of the high voltage battery pack is shown in FIG. 12, the pre-charging method comprises the following steps:

Step 301: controlling the main positive pre-charging module to be switched on.

In one example, the control module firstly switches on the main negative switching module and then controls the main positive pre-charging module to be switched on. Alternatively, the control module simultaneously switches on the main negative switching module and the main positive pre-charging module. Alternatively, the control module firstly switches on the main positive pre-charging module and then switches on the main negative switching module.

Step 302: detecting the voltage at the first end of the main positive switching module and the voltage at the second end of the main positive switching module.

Step 303: determining whether the voltage at the first end of the main positive switching module and the voltage at the second end of the main positive switching module conform with a second constraint relationship.

Specifically, after the control module determines that the voltage at the first end of the main positive switching module and the voltage at the second end of the main positive switching module conform with the second constraint relationship, step 304 is performed; otherwise, the process returns to step 302.

Step 304: switching on the main positive switching module and switching off the main positive pre-charging module.

Specifically, the pre-charging circuit for the high voltage battery pack further comprises a discharging module, the main positive connection end is connected to the first end of the discharging module, and the main negative connection end is connected to the second end of the discharging module. When the main positive pre-charging module is switched on, the high voltage battery pack pre-charges a capacitive component across the discharging module, and after the main positive switching module is switched on, the high voltage battery pack is discharged to the discharging module.

In one example, the pre-charging circuit for the high voltage battery pack further comprises a second current detecting module, the second end of the main positive switching module is connected to the main positive connection terminal through the second current detecting module, and the second current detecting module is connected to the control module. The control module monitors the current in the branch of the main positive switching module through the second current detecting module, after the main positive switching module is switched on and the main positive pre-charging module is switched off. The control module reports an over-current fault when determining that the current value detected by the second current detecting module exceeds the second threshold.

In one example, the pre-charging circuit for the high voltage battery pack further comprises a third current detecting module, the second end of the main negative switching module is connected to the main negative connection end through the third current detecting module; and the third current detecting module is connected to the control module. During the charging process, after the charging module is switched on and the charging pre-charging module is switched off, the control module reports an over-current fault when determining that the current value detected by the third current detecting module exceeds the first threshold; during the discharging process, after the main positive switching module is switched on and the main positive pre-charging module is switched off, the pre-charging method further comprises: reporting an over-current fault when determining that the current value detected by the third current detecting module exceeds the second threshold.

In one example, after the over-current fault is reported, the control module reduces the current in the branch of the main positive switching module by performing strategies, such as switching off the main positive switching module or the main negative switching module, reducing power, etc.

In one example, the discharging module comprises N load sub-modules, and the pre-charging circuit for the high voltage battery pack further comprises N fourth current detecting modules, and the N load sub-modules are in one-to-one correspondence with the N fourth current detecting modules; a first end of each of the load sub-modules is connected to a second end of a corresponding fourth current detecting module through a load switch, a first end of each of the fourth current detecting modules is connected to the main positive connection end, a second end of each of the load sub-modules is connected to the main negative connection end; each of the fourth current detecting modules is connected to the control module. The control module monitors the current in the branch of each of load sub-modules is located through the fourth current detecting module after controlling the main positive switching module to be switched on and the main positive pre-charging module to be switched off, and reports an over-current fault when determining that a current value detected by the fourth current detecting module exceeds a third threshold.

It should be noted that, as can be understood by those skilled in the art, the number of current detecting modules can be determined according to the number of switches in the pre-charging circuit for the high voltage battery pack. Alternatively, a current detecting module may be provided in the branch of each switch, or be provided in branches of some switches. The present embodiment does not limit the number and position of the current detecting module.

Figure 13:
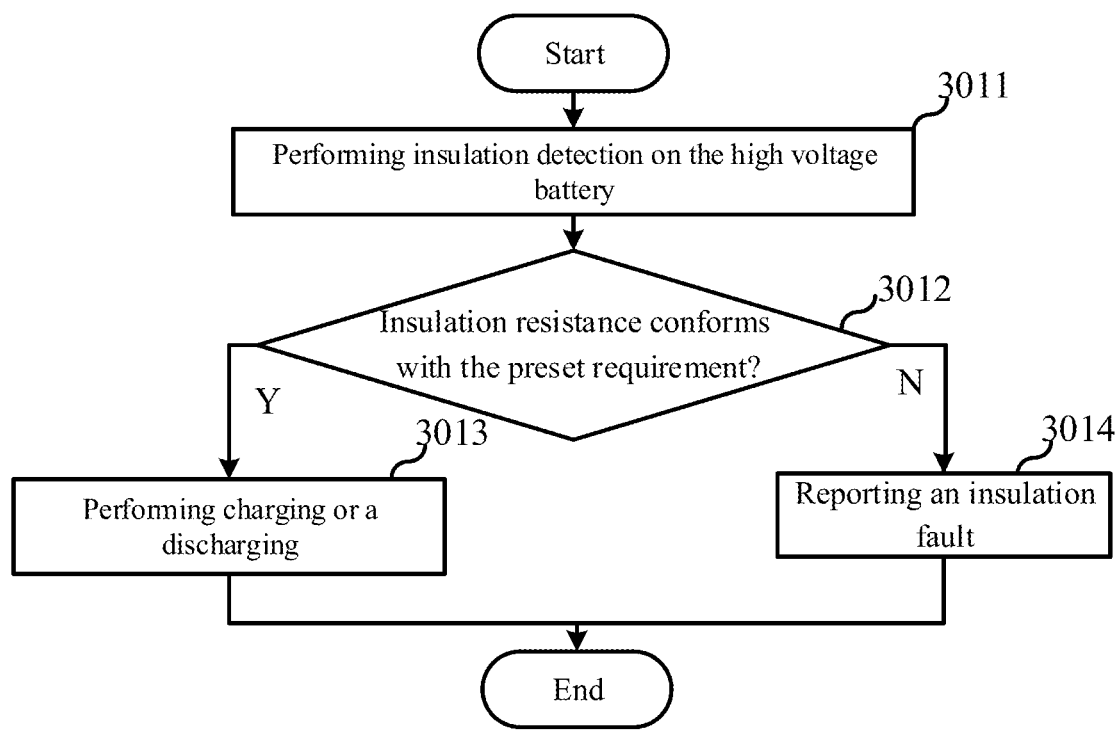
FIG. 13 is a schematic diagram illustrating an overall strategy of a pre-charging method according to the yet another embodiment of the present disclosure.

In one example, the control module determines that the insulation resistance of the high voltage battery pack conforms with a preset requirement before controlling the charging pre-charging module to be switched on. In this case, a schematic diagram of the overall strategy of the pre-charging method for the high voltage battery pack is shown in FIG. 13, and the method comprises the following steps:

Step 3011: performing insulation detection on the high voltage battery pack.

Step 3012: determining whether the insulation resistance conforms with the preset requirement.

Specifically, if the insulation resistance conforms with the preset requirement, step 3013 is performed, otherwise, step 3014 is performed. The preset requirement may be set as needed. For example, the preset requirement is that the insulation resistance is greater than a fifth preset value.

Step 3013: performing charging or a discharging.

Specifically, if the charging process is performed currently, after the insulation resistance conforms with the preset requirement, steps 201 to 204 are performed. If the discharge process is performed currently, after the insulation resistance value conforms with the preset requirement, steps 301 to 304 are performed.

Step 3014: reporting an insulation fault.

Specifically, since the insulation resistance of the high voltage battery pack does not conform with the preset requirement, a fault may be occurred in the insulation portion of the high voltage battery pack, which has to be reported.

It is not difficult to find out that the present embodiment is a method embodiment corresponding to the embodiment described with reference to FIGS. 1-5, and the present embodiment can be implemented in cooperation with the embodiment described with reference to FIGS. 1-5. The related technical details mentioned in the embodiment described with reference to FIGS. 1-5 still work in the present embodiment, and are not described herein again for conciseness. Correspondingly, the related technical details mentioned in the present embodiment may also be applied to the embodiment described with reference to FIGS. 1-5.

The steps of the above various methods are divided for the sake of clear description. These steps may be combined into one step, or a certain step may be split into multiple steps, and they are all covered by the protection scope of this invention as long as the same logical relationship is comprised. The core designs with addition of insignificant modification or introduction of insignificant design to the algorithm or process is covered by the protection scope of this invention as long as its algorithms and processes are not changed.

Still another embodiment of the present disclosure relates to a pre-charging method for the high voltage battery pack and it is a further improvement made based on the embodiment described with reference to FIGS. 11-13, the specific improvement is that the hierarchical pre-charging during the charging process is achieved by controlling the sequences of switching on and switching off the charging switching module, the charging pre-charging module, the main negative switching module, and the main negative pre-charging module; and the hierarchical pre-charging during the discharging process is achieved by controlling the sequences of switching on and switching off the main positive switching module, the main positive pre-charging module, the main positive switching module, and the main negative pre-charging module.

Figure 14:
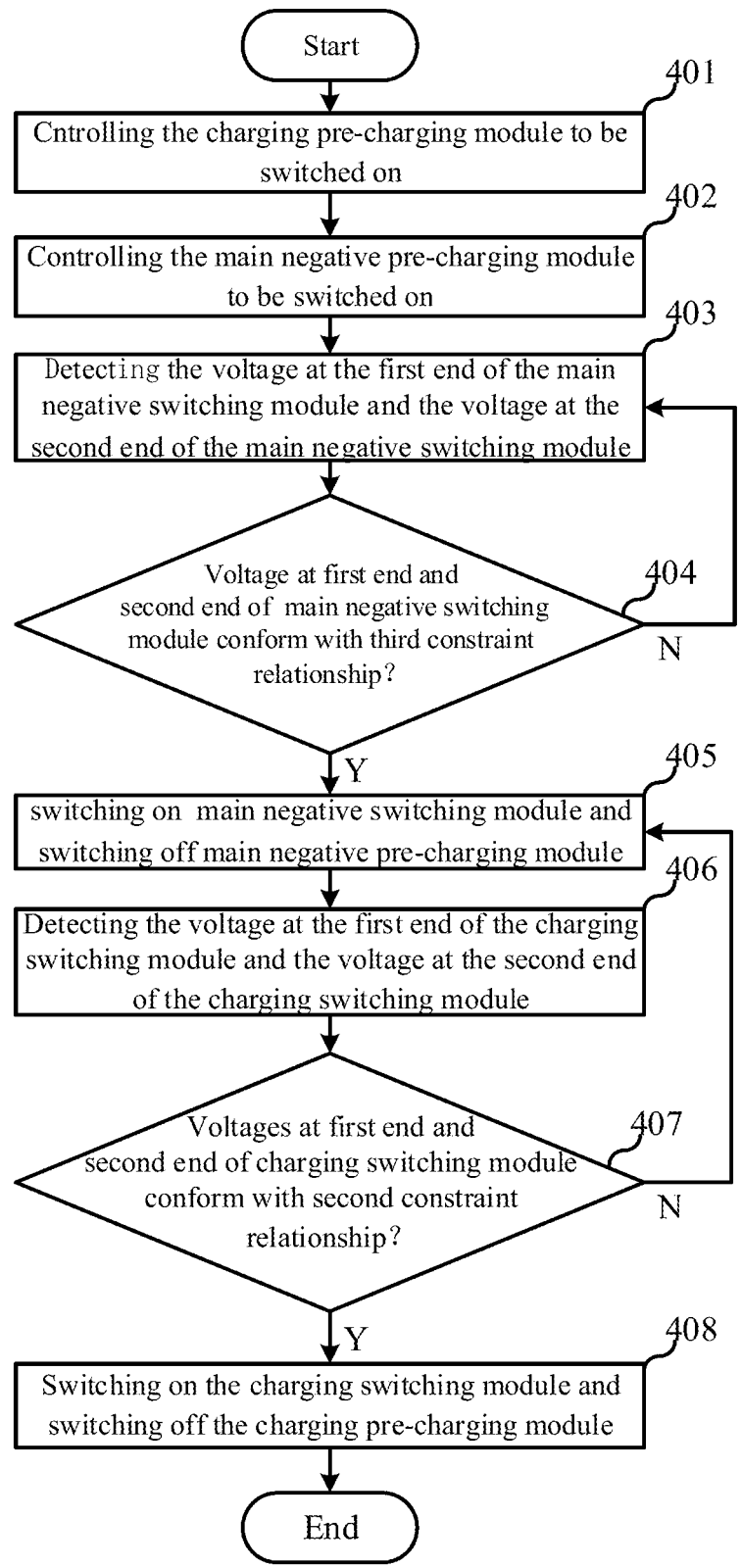
FIG. 14 is a flow chart of a pre-charging method in a charging process according to still another embodiment of the present disclosure.

Specifically, during the charging process, as shown in FIG. 14, the pre-charging method for the high voltage battery pack of the present embodiment comprises steps 401 to 408, wherein steps 401, 406 to 408 are substantially the same as steps 201 to 204 of the embodiment described with reference to FIGS. 11-13, respectively, which will not be described in detail herein. The following are the differences:

Step 401: controlling the charging pre-charging module to be switched on.

Step 402: controlling the main negative pre-charging module to be switched on.

It should be noted that, as can be understood by those skilled in the art, in the present embodiment, step 401 is presented as a previous step of step 402 for clear description. In practical applications, step 402 and step 401 may be performed simultaneously, or step 402 may be performed firstly and then step 401 is performed, and the sequence of steps 401 and 402 is not limited in the present embodiment.

Step 403: detecting the voltage at the first end of the main negative switching module and the voltage at the second end of the main negative switching module.

Step 404: determining whether the voltage at the first end of the main negative switching module and the voltage at the second end of the main negative switching module conform with the third constraint relationship.

Specifically, after the control module determines that the voltage at the first end of the main negative switching module and the voltage at the second end of the main negative switching module conform with the third constraint relationship, step 405 is performed; otherwise, the process returns to step 403.

Step 405: switching on the main negative switching module and switching off the main negative pre-charging module.

Step 406: detecting the voltage at the first end of the charging switching module and the voltage at the second end of the charging switching module.

Step 407: determining whether the voltage at the first end of the charging switching module and the voltage at the second end of the charging switching module conform with the second constraint relationship.

Specifically, after the control module determines that the voltage at the first end of the charging switching module and the voltage at the second end of the charging switching module conform with the second constraint relationship, step 408 is performed; otherwise, step 406 is performed again.

Step 408: switching on the charging switching module and switching off the charging pre-charging module.

The control module achieves the hierarchical pre-charging during the charging process by performing steps 401 to 408.

Figure 15:
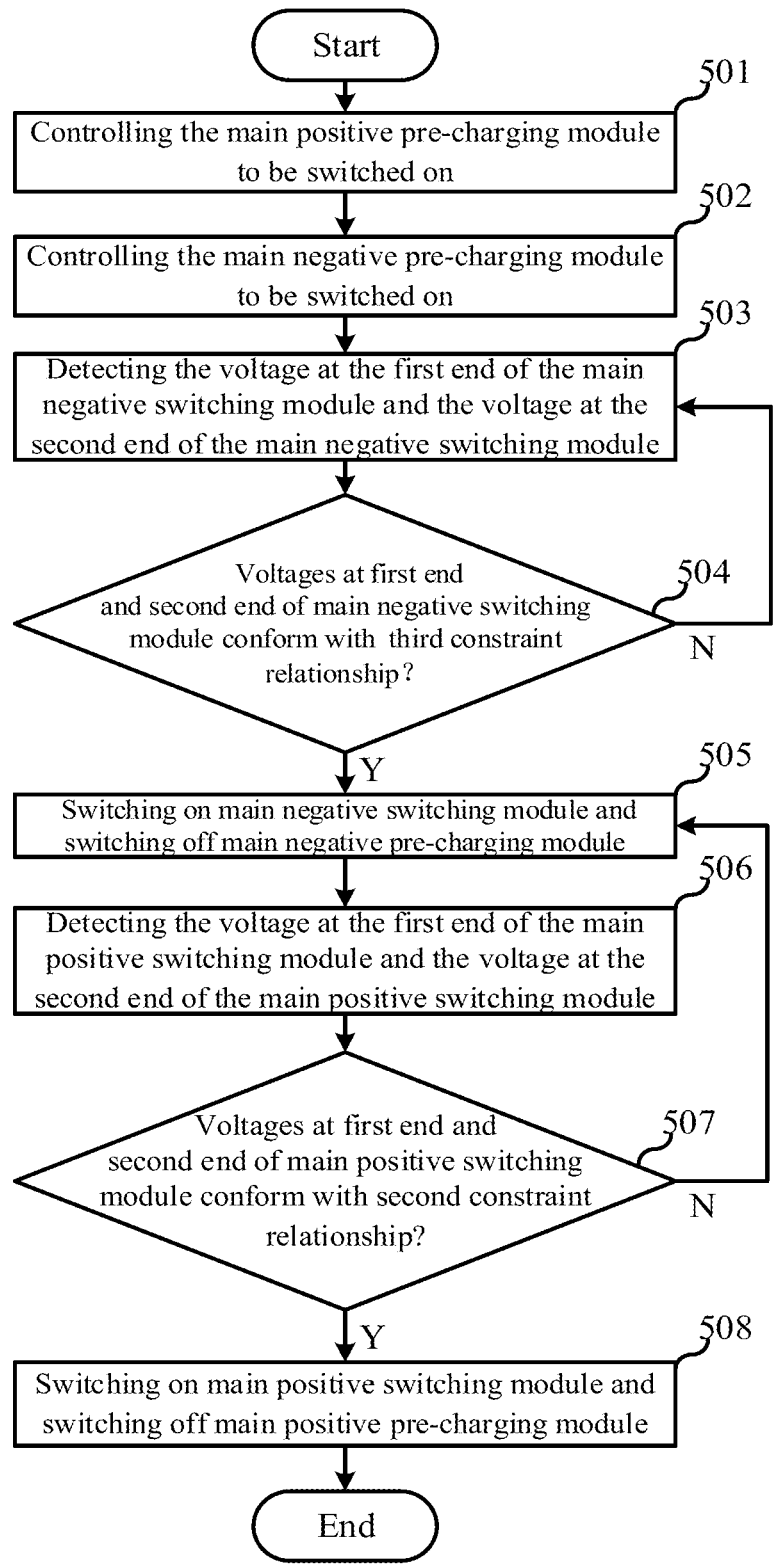
FIG. 15 is a flow chart of a pre-charging method in a discharging process according to the still another embodiment of the present disclosure.

As shown in FIG. 15, during the discharging process, the pre-charging method for the high voltage battery pack of the present embodiment comprises steps 501 to 508, the steps 501, 506 to 508 are substantially the same as the steps 301 to 304 of the embodiment described with reference to FIGS. 11-13, respectively, which will not be described in detail herein. The following are the differences:

Step 501: controlling the main positive pre-charging module to be switched on.

Step 502: controlling the main negative pre-charging module to be switched on.

It should be noted that, as can be understood by those skilled in the art, in the present embodiment, step 501 is presented as a previous step of step 502 for clear description 2. In practical applications, step 502 and step 501 may be performed simultaneously, or step 502 may be performed firstly and then step 501 is performed, and the sequence of steps 501 and 502 is not limited in the present embodiment.

Step 503: detecting the voltage at the first end of the main negative switching module and the voltage at the second end of the main negative switching module.

Step 504: determining whether the voltage at the first end of the main negative switching module and the voltage at the second end of the main negative switching module conform with the third constraint relationship.

Specifically, after the control module determines that the voltage at the first end of the main negative switching module and the voltage at the second end of the main negative switching module conform with the third constraint relationship, step 505 is performed; otherwise, the process returns to step 503.

Step 505: switching on the main negative switching module and switching off the main negative pre-charging module.

Step 506: detecting the voltage at the first end of the main positive switching module and the voltage at the second end of the main positive switching module.

Step 507: determining whether the voltage at the first end of the main positive switching module and the voltage at the second end of the main positive switching module conform with the second constraint relationship.

Specifically, after the control module determines that the voltage at the first end of the main positive switching module and the voltage at the second end of the main positive switching module conform with the second constraint relationship, step 508 is performed; otherwise, step 506 is performed again.

Step 508: switching on the main positive switching module and switching off the main positive pre-charging module.

It should be noted that, in the present embodiment, for the sake of clarity, during the charging process, the voltage across the main negative switching module is detected first, and the main negative switching module is controlled to be switched on according to the detection result, and then the voltage across the charging switching module is detected, and the charging switching module is controlled to be switched on according to the detection result, so as achieve the hierarchical pre-charging. In practical applications, the hierarchical pre-charging in the charging process can be realized in other ways.

For example, during the charging process, the control module firstly controls the main negative pre-charging module and the charging pre-charging module to be switched on, and detects the voltage at the first end of the charging switching module and the voltage at the second end of the charging switching module; determines if the voltage at the first end of the charging switching module and the voltage at the second end of the charging switching module conform with the first constraint relationship; if so, the charging switching module is switched on, and the charging pre-charging module is switched off. The control module detects the voltage at the first end of the main negative switching module and the voltage at the second end of the main negative switching module after the charging switching module is switched on and the charging pre-charging module is switched off; determines if the voltage at the first end of the main negative switching module and the voltage at the second end of the main negative switching module conform with the third constraint relationship; if so, the main negative switching module is switched on, and the main negative pre-charging module is switched off. The sequence of controlling the main negative switching module and the charging switching module when implementing the hierarchical pre-charging during the charging process is not limited in the present embodiment.

It should be noted that, in the present embodiment, for the sake of clarity, during the discharging process, the voltage across the main negative switching module is detected first, and the main negative switching module is controlled to be switched on according to the detection result, and then the voltage across the main positive switching module is detected, and the main positive switch is controlled to be switched on according to the detection result, so as to achieve the hierarchical pre-charging. In practical applications, the hierarchical pre-charging in the discharging process may be realized in other ways.

For example, during the discharging process, the control module firstly controls the main negative pre-charging module and the main positive pre-charging module to be switched on, and detects the voltage at the first end of the main positive switching module and the voltage at the second end of the main positive switching module; determines if the voltage at the first end of the main positive switching module and the voltage at the second end of the main positive switching module conform with the second constraint relationship; if so, the main positive switching module is switched on, and the main positive pre-charging module is switched off. The control module detects the voltage at the first end of the main negative switching module and the voltage at the second end of the main negative switching module after the main positive switching module is switched on and the main positive pre-charging module is switched off; determines if the voltage at the first end of the main negative switching module and the voltage at the second end of the main negative switching module conform with the third constraint relationship; if so, the main negative switching module is switched on, and the main negative pre-charging module is switched off. The sequence of controlling the main negative switching module and the charging switching module when implementing the hierarchical pre-charging during the discharging process is not limited in the present embodiment.

It is easy to find out that the present embodiment is a method embodiment corresponding to the embodiment described with reference to FIGS. 6-10, and the present embodiment can be implemented in cooperation with the embodiment described with reference to FIGS. 6-10. The related technical details mentioned in the embodiment described with reference to FIGS. 6-10 still work in the present embodiment, and are not described herein again for conciseness. Correspondingly, the related technical details mentioned in the present embodiment may also be applied to the embodiment described with reference to FIGS. 6-10.

Those skilled in the art will appreciate that the above embodiments are specific embodiments for implementing the present disclosure, and in practice, various changes could be made formally and in detail without departing from the spirit and scope of the present disclosure.

What is claimed is:

1. A pre-charging circuit for a high voltage battery pack, comprising: a main positive switching module, a main positive pre-charging module, a charging switching module, a charging pre-charging module, a main negative switching module, and a control module;

wherein, a positive electrode of the high voltage battery pack is connected to a first end of the main positive switching module and a first end of the charging switching module respectively, and a negative electrode of the high voltage battery pack is connected to a first end of the main negative switching module; a second end of the main positive switching module is connected to a main positive connection end of the pre-charging circuit, and a second end of the charging switching module is connected to a charging connection end of the pre-charging circuit, a second end of the main negative switching module is connected to a main negative connection end of the pre-charging circuit, the main positive pre-charging module is connected in parallel with the main positive switching module, and the charging pre-charging module is connected in parallel with the charging switching module;

during a charging process, the control module controls the charging pre-charging module to be switched on, detecting a voltage at the first end of the charging switching module and a voltage at the second end of the charging switching module, and after determining that the voltage at the first end of the charging switching module and the voltage at the second end of the charging switching module conform with a first constraint relationship, switching on the charging switching module and switching off the charging pre-charging module;

during a discharging process, the control module controls the main positive pre-charging module to be switched on, detecting a voltage at the first end of the main positive switching module and a voltage at the second end of the main positive switching module, and after determining that the voltage at the first end of the main positive switching module and the voltage at the second end of the main positive switching module conform with a second constraint relationship, switching on the main positive switching module and switching off the main positive pre-charging module.

2. The pre-charging circuit for the high voltage battery pack according to claim 1, wherein the pre-charging circuit for the high voltage battery pack further comprises a main negative pre-charging module connected in parallel with the main negative switching module.

3. The pre-charging circuit for the high voltage battery pack according to claim 1, wherein the charging pre-charging module comprises a charging pre-charging switch and a first resistor network connected in series; the main positive pre-charging module comprises a main positive pre-charging switch and a second resistor network connected in series.

4. The pre-charging circuit for the high voltage battery pack according to claim 2, wherein the main negative pre-charging module comprises a main negative pre-charging switch and a third resistor network connected in series.

5. The pre-charging circuit for the high voltage battery pack according to claim 1, further comprising a first current detecting module;

the second end of the charging switching module is connected to the charging connection end through the first current detecting module, and the first current detecting module is connected to the control module; and the control module reports an over-current fault when determining that a current value detected by the first current detecting module exceeds a first threshold.

6. The pre-charging circuit for the high voltage battery pack according to claim 1, further comprising a second current detecting module;

the second end of the main positive switching module is connected to the main positive connection end through the second current detecting module, and the second current detecting module is connected to the control module;

the control module reports an over-current fault when determining that a current value detected by the second current detecting module exceeds a second threshold.

7. The pre-charging circuit for the high voltage battery pack according to claim 1, further comprising a third current detecting module;

the second end of the main negative switching module is connected to the main negative connection end through the third current detecting module, and the third current detecting module is connected to the control module;

during the charging process, the control module reports an over-current fault when determining that a current value detected by the third current detecting module exceeds a first threshold;

during the discharging process, the control module reports an over-current fault when determining that the current value detected by the third current detecting module exceeds a second threshold.

8. The pre-charging circuit of the high voltage battery pack according to claim 1, further comprising a charging module and a discharging module;

a first end of the charging module is connected to the charging connection end, a second end of the charging module is connected to the main negative connection end, and a first end of the discharging module is connected to the main positive connection end, a second end of the discharging module is connected to the main negative connection end.

9. The pre-charging circuit of the high voltage battery pack according to claim 8, wherein the discharging module comprises N load sub-modules, and the pre-charging circuit for the high voltage battery pack further comprises N fourth current detecting modules, and the N load sub-modules and the N fourth current detecting modules are in one-to-one correspondence;

wherein, a first end of each of the load sub-modules is connected to a second end of a corresponding fourth current detecting module through a load switch, a first end of each of the fourth current detecting modules is connected to the main positive connection end, a second end of each of the load sub-modules is connected to the main negative connection end;

each of the fourth current detecting modules is connected to the control module;

in the discharging process, the control module reports an over-current fault when determining that a current value detected by the fourth current detecting module exceeds a third threshold;

wherein, N is a positive integer.

10. A pre-charging method of the high voltage battery pack applied to the pre-charging circuit for the high voltage battery pack according to claim 1, comprising:

during the charging process:

controlling the charging pre-charging module to be switched on;

detecting the voltage at the first end of the charging switching module and the voltage at the second end of the charging switching module;
determining if the voltage at the first end of the charging switching module and the voltage at the second end of the charging switching module conform with the first constraint relationship;
if so, switching on the charging switching module, and switching off the charging pre-charging module;
during the discharging process:
controlling the main positive pre-charging module to be switched on;
detecting the voltage at the first end of the main positive switching module and the voltage at the second end of the main positive switching module;
determining if the voltage at the first end of the main positive switching module and the voltage at the second end of the main positive switching module conform with the second constraint relationship;
if so, switching on the main positive switching module, and switching off the main positive pre-charging module.

11. The pre-charging method according to claim 10, further comprising:
switching on the main negative switching module before controlling the charging pre-charging module to be switched on, or before controlling the main positive pre-charging module to be switched on.

12. The pre-charging method according to claim 10, wherein the pre-charging circuit for the high voltage battery pack further comprises a main negative pre-charging module connected in parallel with the main negative switching module; and
during the charging process, the pre-charging method further comprises: performing the following steps before detecting the voltage at the first end of the charging switching module and the voltage at the second end of the charging switching module:
controlling the main negative pre-charging module to be switched on;
detecting a voltage at the first end of the main negative switching module and a voltage at the second end of the main negative switching module;
determining if the voltage at the first end of the main negative switching module and the voltage at the second end of the main negative switching module conform with a third constraint relationship; and
if so, switching on the main negative switching module, and switching off the main negative pre-charging module;
during the discharging process, the pre-charging method further comprises, performing the following steps before detecting the voltage at the first end of the main positive switching module and the voltage at the second end of the main positive switching module:
controlling the main negative pre-charging module to be switched on;
detecting the voltage at the first end of the main negative switching module and the voltage at the second end of the main negative switching module;
determining if the voltage at the first end of the main negative switching module and the voltage at the second end of the main negative switching module conform with the third constraint relationship; and
if so, switching on the main negative switching module, and switching off the main negative pre-charging module.

13. The pre-charging method according to claim 10, wherein the pre-charging circuit for the high voltage battery pack further comprises a main negative pre-charging module connected in parallel with the main negative switching module; and
during the charging process,
the pre-charging method further comprises controlling the main negative pre-charging module to be switched on before detecting the voltage at the first end of the charging switching module and the voltage at the second end of the charging switching module: and
the pre-charging method further comprises performing the following steps, after switching on the charging switching module and switching off the charging pre-charging module:
detecting the voltage at the first end of the main negative switching module and the voltage at the second end of the main negative switching module;
determining if the voltage at the first end of the main negative switching module and the voltage at the second end of the main negative switching module conform with a third constraint relationship; and
if so, switching on the main negative switching module, and switching off the main negative pre-charging module;
during the discharging process,
the pre-charging method further comprises controlling the main negative pre-charging module to be switched on, before detecting the voltage at the first end of the main positive switching module and the voltage at the second end of the main positive switching module; and
the pre-charging method further comprises performing the following steps, after switching on the main positive switching module and switching off the main positive pre-charging module:
detecting the voltage at the first end of the main negative switching module and the voltage at the second end of the main negative switching module;
determining if the voltage at the first end of the main negative switching module and the voltage at the second end of the main negative switching module conform with the third constraint relationship; and
if so, switching on the main negative switching module, and switching off the main negative pre-charging module.

14. The pre-charging method according to claim 10, further comprising:
determining if an insulation resistance of the high voltage battery pack conforms with a preset requirement; and if so, controlling the charging pre-charging module to be switched on, or controlling the main positive pre-charging module to be switched on.

15. The pre-charging method according to claim 10, wherein the pre-charging circuit for the high voltage battery pack further comprises a first current detecting module;
the second end of the charging switching module is connected to the charging connection end through the first current detecting module, and the first current detecting module is connected to the control module;
during the charging process, the pre-charging method further comprises: reporting an over-current fault when determining that a current value detected by the first current detecting module exceeds a first threshold, after switching on the charging switching module and switching off the charging pre-charging module.

16. The pre-charging method according to claim 10, wherein the pre-charging circuit for the high voltage battery pack further comprises a second current detecting module;
   a second end of the main positive switching module is connected to the main positive connection end through the second current detecting module, and the second current detecting module is connected to the control module;
   during the discharging process, the pre-charging method further comprises: reporting an over-current fault when determining that a current value detected by the second current detecting module exceeds a second threshold, after switching on the main positive switching module and switching off the main positive pre-charging module.

17. The pre-charging method according to claim 10, wherein the pre-charging circuit for the high voltage battery pack further comprises a third current detecting module;
   a second end of the main negative switching module is connected to the main negative connection end through the third current detecting module, and the third current detecting module is connected to the control module;
   during the charging process, the pre-charging method further comprises: reporting an over-current fault when determining that a current value detected by the third current detecting module exceeds the first threshold, after switching on the charging switching module and switching off the charging pre-charging module;
   during the discharging process, the pre-charging method further comprises:
   reporting an over-current fault when determining that the current value detected by the third current detecting module exceeds the second threshold, after switching on the main positive switching module and switching off the main positive pre-charging module.

18. The pre-charging method according to claim 10, wherein the pre-charging circuit for the high voltage battery pack further comprises a discharging module and N fourth current detecting modules, the discharging module comprises N load sub-modules, and the N load sub-modules and the N fourth current detecting modules are in one-to-one correspondence;
   a first end of each of the load sub-modules is connected to a second end of a corresponding fourth current detecting module through a load switch, a first end of each of the fourth current detecting modules is connected to the main positive connection end, a second end of each of the load sub-modules is connected to the main negative connection end;
   each of the fourth current detecting modules is connected to the control module;
   during the discharging process, the pre-charging method further comprises:
   reporting an over-current fault when determining that a current value detected by the fourth current detecting module exceeds a third threshold, after switching on the main positive switching module and switching off the main positive pre-charging module.

19. A pre-charging circuit for a high voltage battery pack, comprising: a main positive switching module, a main positive pre-charging module, a charging switching module, a charging pre-charging module, a main negative switching module, a main negative pre-charging module and a control module;
   wherein, a positive electrode of the high voltage battery pack is connected to a first end of the main positive switching module and a first end of the charging switching module respectively, and a negative electrode of the high voltage battery pack is connected to a first end of the main negative switching module; a second end of the main positive switching module is connected to a main positive connection end of the pre-charging circuit, and a second end of the charging switching module is connected to a charging connection end of the pre-charging circuit, a second end of the main negative switching module is connected to a main negative connection end of the pre-charging circuit, the main positive pre-charging module is connected in parallel with the main positive switching module, the charging pre-charging module is connected in parallel with the charging switching module, and the main negative pre-charging module is connected in parallel with the main negative switching module;
   during a charging process, wherein the high voltage battery pack is configured to charge a capacitive component connected across the charging connection end and the main negative connection end, the pre-charging circuit is configured:
   to control, by the control module, the charging pre-charging module to be switched on;
   to control, by the control module, the main negative pre-charging module to be switched on;
   when a voltage at the first end of the main negative switching module is not less than p times a voltage at the second end of the main negative switching module, wherein p is a positive number less than 1, to switch on the main negative switching module and to switch off the main negative pre-charging module;
   when a voltage at the second end of the charging switching module is not less than k times a voltage at the first end of the charging switching module, wherein k is a positive number less than 1, to switch on the charging switching module and to switch off the charging pre-charging module;
   during a discharging process, wherein the high voltage battery pack is configured to charge a capacitive component connected across the main positive connection end and the main negative connection end, the pre-charging circuit is configured:
   to control, by the control module, the main positive pre-charging module to be switched on;
   to control, by the control module, the main negative pre-charging module to be switched on;
   when the voltage at the first end of the main negative switching module is not less than p times the voltage at the second end of the main negative switching module, wherein p is a positive number less than 1, to switch on the main negative switching module and to switch off the main negative pre-charging module;
   when a voltage at the second end of the main positive switching module is not less than t times a voltage at the first end of the main positive switching module, wherein t is a positive number less than 1, to switch on the main positive switching module and to switch off the main positive pre-charging module.

* * * * *